(12) United States Patent
Kolb et al.

(10) Patent No.: US 9,416,206 B2
(45) Date of Patent: *Aug. 16, 2016

(54) LUBRICATING OIL COMPOSITIONS AND METHOD FOR MAKING THEM

(75) Inventors: Rainer Kolb, Kingwood, TX (US); Liehpao Oscar Farng, Lawrenceville, NJ (US); Sudhin Datta, Houston, TX (US); Donna J. Crowther, Seabrook, TX (US); Peijun Jiang, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/005,388

(22) Filed: Jan. 12, 2011

(65) Prior Publication Data

US 2011/0183879 A1   Jul. 28, 2011

Related U.S. Application Data

(60) Provisional application No. 61/297,621, filed on Jan. 22, 2010, provisional application No. 61/368,997, filed on Jul. 29, 2010.

(51) Int. Cl.

| | |
|---|---|
| *C08F 210/02* | (2006.01) |
| *C08F 10/00* | (2006.01) |
| *C08F 210/16* | (2006.01) |
| *C08L 23/08* | (2006.01) |
| *C10M 143/04* | (2006.01) |
| *C10M 143/06* | (2006.01) |
| *C10M 143/08* | (2006.01) |
| *C10M 171/02* | (2006.01) |
| *C10M 171/04* | (2006.01) |
| *C08F 4/6592* | (2006.01) |
| *C08F 4/659* | (2006.01) |

(52) U.S. Cl.
CPC .............. *C08F 210/02* (2013.01); *C08F 10/00* (2013.01); *C08F 210/16* (2013.01); *C08L 23/0807* (2013.01); *C10M 143/04* (2013.01); *C10M 143/06* (2013.01); *C10M 143/08* (2013.01); *C10M 171/02* (2013.01); *C10M 171/04* (2013.01); *C08F 4/65908* (2013.01); *C08F 4/65927* (2013.01); *C10M 2205/022* (2013.01); *C10N 2230/02* (2013.01); *C10N 2230/04* (2013.01); *C10N 2230/45* (2013.01); *C10N 2240/042* (2013.01); *C10N 2240/08* (2013.01); *C10N 2240/102* (2013.01); *C10N 2240/103* (2013.01); *C10N 2240/104* (2013.01)

(58) Field of Classification Search
CPC ................... C10M 2205/02; C10M 2205/022; C10M 2205/024
USPC ......................................................... 508/591
See application file for complete search history.

(56) References Cited

U.S. PATENT DOCUMENTS

| | | | |
|---|---|---|---|
| 1,969,324 A | 8/1934 | Poulter | |
| 2,969,324 A | 1/1961 | Knapp, Jr. et al. | |
| 3,760,001 A | 9/1973 | Staendeke | |
| 3,778,375 A | 12/1973 | Braid et al. | |
| 3,779,928 A | 12/1973 | Schlicht | |
| 3,852,205 A | 12/1974 | Kablaoui et al. | |
| 3,879,306 A | 4/1975 | Kablaoui et al. | |
| 3,932,290 A | 1/1976 | Koch et al. | |
| 3,933,659 A | 1/1976 | Lyle et al. | |
| 4,028,258 A | 6/1977 | Kablaoui et al. | |
| 4,105,571 A | 8/1978 | Shaub et al. | |
| 4,176,074 A | 11/1979 | Coupland et al. | |
| 4,344,853 A | 8/1982 | Gutierrez et al. | |
| 4,464,493 A | 8/1984 | Joffrion | |
| 4,540,753 A | 9/1985 | Cozewith et al. | |
| 4,542,199 A | 9/1985 | Kaminsky et al. | |
| 4,752,597 A | 6/1988 | Turner | |
| 4,792,595 A | 12/1988 | Cozewith et al. | |
| 4,804,794 A | 2/1989 | Ver Strate et al. | |
| 4,871,705 A | 10/1989 | Hoel | |
| 4,892,851 A | 1/1990 | Ewen et al. | |
| 4,959,436 A | 9/1990 | Cozewith et al. | |
| 5,008,204 A | 4/1991 | Stehling | |
| 5,017,714 A | 5/1991 | Welborn, Jr. | |

(Continued)

FOREIGN PATENT DOCUMENTS

| | | |
|---|---|---|
| EP | 0 277 003 | 8/1988 |
| EP | 0 277 004 | 8/1988 |

(Continued)

OTHER PUBLICATIONS

U.S. Appl. No. 60/243,192, "*Processes and Apparatus for Continuous Solution Polymerization*", Oct. 25, 2000.
Sun et al., "*A Study of the Separation Principle in Size Exclusion Chromatography*", Macromolecules, vol. 37, No. 11, pp. 4304-4312 (2004).
Sun et al., "*Effect of Short Chain Branching on the Coil Dimensions of Polyolefins in Dilute Solution*", Macromolecules, vol. 34, No. 19, pp. 6812-6820 (2001).
H.N. Cheng et al., "$^{13}C$ *NMR Analysis of Compositional Heterogeneity in Ethylene-Propylene Copolymers*", Macromolecules, vol. 24, No. 8, pp. 1724-1726 (1991).
H.N. Cheng, "$^{13}C$ *NMR Analysis of Ethylene-Propylene Rubbers*", Macromolecules, vol. 17, No. 10, pp. 1950-1955 (1984), Macromolecules, vol. 17, No. 10, pp. 1950-1955 (1984).
C. Cozewith, "*Interpretation of* $^{13}C$ *NMR Sequence Distribution for Ethylene-Propylene Copolymers Made with Heterogeneous Catalysts*", vol. 20, No. 6, pp. 1237-1244 (1987).
C. Cozewith et al., "*Ethylene-Propylene Copolymers. Reactivity Ratios, Evaluation, and* Significance", Macromolecules, vol. 4, pp. 482-489 (1971).

(Continued)

*Primary Examiner* — Ellen McAvoy
(74) *Attorney, Agent, or Firm* — Stephen A. Baehl

(57) ABSTRACT

Provided are ethylene propylene copolymers compositions thereof and methods for making the same. The composition may include an ethylene copolymer, comprising 40 wt % to 70 wt % of units derived from ethylene, and at least 30 wt % of units derived from at least one $\alpha$-olefin having 3 to 20 carbon atoms. The composition can have a melting point (Tm) in ° C., as measured by DSC, that satisfies the relation: $Tm > 3.4 \times E - 180$, where E is the weight % of units derived from ethylene in the copolymer. The composition can also have a Mw/Mn ratio of about 1.5 to about 3.5. The composition can further have a content of Group 4 metals derived from a catalyst of 25 ppm or less.

25 Claims, No Drawings

(56) References Cited

U.S. PATENT DOCUMENTS

| | | | |
|---|---|---|---|
| 5,026,798 | A | 6/1991 | Canich |
| 5,055,438 | A | 10/1991 | Canich |
| 5,068,047 | A | 11/1991 | Chung et al. |
| 5,096,867 | A | 3/1992 | Canich |
| 5,120,867 | A | 6/1992 | Welborn, Jr. |
| 5,132,262 | A | 7/1992 | Rieger et al. |
| 5,132,281 | A | 7/1992 | Chevallier et al. |
| 5,151,204 | A | 9/1992 | Struglinski |
| 5,153,157 | A | 10/1992 | Hlatky et al. |
| 5,155,080 | A | 10/1992 | Elder et al. |
| 5,198,401 | A | 3/1993 | Turner et al. |
| 5,243,001 | A | 9/1993 | Winter et al. |
| 5,264,405 | A | 11/1993 | Canich |
| 5,278,119 | A | 1/1994 | Turner et al. |
| 5,278,264 | A | 1/1994 | Spaleck et al. |
| 5,296,434 | A | 3/1994 | Karl et al. |
| 5,304,614 | A | 4/1994 | Winter et al. |
| 5,318,935 | A | 6/1994 | Canich et al. |
| 5,324,800 | A | 6/1994 | Welborn, Jr. et al. |
| 5,382,630 | A | 1/1995 | Stehling et al. |
| 5,387,568 | A | 2/1995 | Ewen et al. |
| 5,391,617 | A | 2/1995 | Olivier et al. |
| 5,391,629 | A | 2/1995 | Turner et al. |
| 5,446,221 | A | 8/1995 | Struglinski |
| 5,451,630 | A | 9/1995 | Olivier et al. |
| 5,451,636 | A | 9/1995 | Olivier et al. |
| 5,621,126 | A | 4/1997 | Canich et al. |
| 5,665,800 | A | 9/1997 | Lai et al. |
| 5,837,773 | A | 11/1998 | Olivier et al. |
| 5,955,625 | A | 9/1999 | Canich |
| 5,969,070 | A | 10/1999 | Waymouth et al. |
| 6,034,187 | A | 3/2000 | Maehama et al. |
| 6,265,338 | B1 | 7/2001 | Canich |
| RE37,400 | E | 10/2001 | Canich |
| 6,319,998 | B1 | 11/2001 | Cozewith et al. |
| 6,376,409 | B1 | 4/2002 | Burkhardt et al. |
| 6,376,412 | B1 | 4/2002 | Burkhardt et al. |
| 6,380,120 | B1 | 4/2002 | Burkhardt et al. |
| RE37,788 | E | 7/2002 | Canich |
| 6,525,007 | B2 | 2/2003 | Okada et al. |
| 6,589,920 | B2 | 7/2003 | Okada et al. |
| 6,638,887 | B1 | 10/2003 | Canich |
| 6,753,381 | B2 | 6/2004 | Mishra et al. |
| 6,835,698 | B2* | 12/2004 | Egawa et al. ............ 508/591 |
| 6,881,800 | B2 | 4/2005 | Friedersdorf |
| 7,022,766 | B2* | 4/2006 | Okada et al. ............ 525/98 |
| 7,122,498 | B2* | 10/2006 | Hart ............ C07F 17/00 502/103 |
| 7,157,591 | B2* | 1/2007 | Burkhardt ............ C07F 17/00 526/160 |
| 7,163,907 | B1 | 1/2007 | Canich et al. |
| 7,232,871 | B2 | 6/2007 | Datta et al. |
| 7,297,747 | B2* | 11/2007 | Hart ............ C07F 17/00 525/240 |
| 7,402,235 | B2* | 7/2008 | Huang ............ 208/18 |
| 7,569,646 | B1 | 8/2009 | Canich |
| 7,662,433 | B2* | 2/2010 | Ford et al. ............ 427/163.1 |
| 7,662,881 | B2* | 2/2010 | Walton et al. ............ 524/543 |
| 7,776,804 | B2* | 8/2010 | Huang et al. ............ 508/591 |
| 7,875,690 | B2* | 1/2011 | Graham et al. ............ 526/348 |
| 7,915,192 | B2 | 3/2011 | Arriola et al. |
| 7,915,358 | B2 | 3/2011 | Ikeda et al. |
| 7,973,115 | B2* | 7/2011 | Hillairet ............ B01J 31/1815 526/161 |
| 8,084,560 | B2* | 12/2011 | Kolb et al. ............ 526/170 |
| 8,309,501 | B2* | 11/2012 | Kolb et al. ............ 508/591 |
| 8,329,835 | B2* | 12/2012 | Goode et al. ............ 526/160 |
| 8,378,043 | B2* | 2/2013 | Graham et al. ............ 526/170 |
| 8,378,048 | B2* | 2/2013 | Kolb et al. ............ 526/348 |
| 8,618,033 | B2* | 12/2013 | Kolb ............ C08F 210/02 508/591 |
| 2002/0055445 | A1 | 5/2002 | Okada et al. |
| 2004/0038850 | A1 | 2/2004 | Huang |
| 2004/0121922 | A1 | 6/2004 | Okada et al. |
| 2009/0205776 | A1 | 8/2009 | Datta et al. |
| 2010/0197540 | A1* | 8/2010 | Shan et al. ............ 508/591 |
| 2010/0197541 | A1* | 8/2010 | Li Pi Shan et al. ............ 508/591 |
| 2010/0273693 | A1 | 10/2010 | Datta et al. |
| 2010/0292114 | A1* | 11/2010 | Huang et al. ............ 508/591 |
| 2011/0183878 | A1* | 7/2011 | Kolb et al. ............ 508/591 |
| 2012/0028867 | A1* | 2/2012 | Datta et al. ............ 508/591 |

FOREIGN PATENT DOCUMENTS

| | | |
|---|---|---|
| EP | 0 287 239 | 10/1988 |
| EP | 0 426 637 | 5/1991 |
| EP | 0 427 697 | 5/1991 |
| EP | 0 495 375 | 7/1992 |
| EP | 0 500 944 | 9/1992 |
| EP | 0 511 665 | 11/1992 |
| EP | 0 520 732 | 12/1992 |
| EP | 0 570 982 | 11/1993 |
| EP | 0 573 403 | 12/1993 |
| EP | 0 577 581 | 1/1994 |
| EP | 0 578 838 | 1/1994 |
| EP | 0 612 768 | 8/1994 |
| EP | 0 638 611 | 2/1995 |
| EP | 1 148 115 | 10/2001 |
| EP | 1 178 102 | 2/2002 |
| EP | 1 262 498 | 12/2002 |
| WO | WO 92/00333 | 1/1992 |
| WO | WO 93/10495 | 5/1993 |
| WO | WO 93/19103 | 9/1993 |
| WO | WO 99/07788 | 2/1999 |
| WO | WO 99/29743 | 6/1999 |
| WO | WO 99/45062 | 9/1999 |
| WO | WO 99/60033 | 11/1999 |
| WO | WO 01/48034 | 7/2001 |
| WO | WO 02/46251 | 6/2002 |
| WO | WO 03/040201 | 5/2003 |
| WO | WO 2006/102146 | 9/2006 |
| WO | WO 2009/012153 | 1/2009 |
| WO | WO 2010/126721 | 11/2010 |

OTHER PUBLICATIONS

Kakugo et al., "$^{13}C$ NMR Determination of Monomer Sequence Distribution in Ethylene-Propylene Copolymers Prepared with with $\delta$-$TiCl_3$—$Al(C_2H_5)_2Cl$", Macromolecules, vol. 15, No. 4, pp. 1150-1152 (1982).

J.C. Randall, "Methylene Sequence Distributions and Numbers Average Sequence Lengths in Ethylene-Propylene Copolymers", Macromolecules, vol. 11, No. 1, pp. 33-36 (1978).

Wild et al., "Determination of Branching Districutions in Polyethylene and Ethylene Copolymers", J. Poly Sci., Poly. Phys. Ed., vol. 20, pp. 441-455 (1982).

G.J. Ray et al., "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, No. 4, pp. 773-778 (1977).

W. Spaleck et al., "The Influence of Aromatic Substituents on the Polymerization Behavior of Bridged Zirconocene Catalysts", Organometallics, vol. 13, pp. 954-963 (1994).

H. Brintzinger et al., "ansa-Zirconocene Polymerization Catalysts with Annelated Ring Ligands-Effects on Catalytic Activity and Polymer Chain Length", Organometallics, vol. 13, pp. 964-970 (1994).

A.C. Ouano, "Gel Permeation Chromatography", Polymer Molecular Weights Part II, ed. P.E. Slade, ed., Marcel Dekker, Inc., NY, pp. 287-368 (1975).

F. Rodriguez, "The Molecular Weight of Polymers", Principles of Polymer System, 3$^{rd}$ ed., Hemisphere Pub. Corp., NY, pp. 155-160 (1989).

G. Ver Strate et al., "Near Monodisperse Ethylene-Propylene Copolymers by Direct Ziegler-Natta Polymerization. Preparation, Characterization, Properties", Macromolecules, vol. 21, pp. 3360-3371 (1988).

Wittig, H. et al., "Uber neue Triaryl-bor-Ver-bindungen und ihre Tetraarylo-borat-Komplexe (V. Mittel.$^1$)," Chemische Berichte, vol. 88, pp. 962-976 (1955).

* cited by examiner

US 9,416,206 B2

LUBRICATING OIL COMPOSITIONS AND METHOD FOR MAKING THEM

CROSS REFERENCE TO RELATED APPLICATIONS

The application claims priority to and the benefit of Provisional Application No. 61/297,621, filed on Jan. 22, 2010, and Provisional Application No. 61/368,997, filed Jul. 29, 2010. This application is related to U.S. patent application Ser. No. 12/761,880, filed Apr. 16, 2010; U.S. patent application Ser. No. 12/762,096, filed Apr. 16, 2010; U.S. patent application Ser. No. 12/569,009, filed Sep. 29, 2009; and International Patent Application No. PCT/US2010/031190, filed Apr. 15, 2010 each of which in turn claims priority to Provisional Application No. 61/173,528, filed Apr. 28, 2009 and Provisional Application No. 61/173,501, filed Apr. 28, 2009, the disclosures of which are incorporated by reference in their entireties.

FIELD OF THE INVENTION

Provided are lubricating oil compositions, methods for making the same, and uses there of. More particularly provided are ethylene propylene copolymers that are useful as viscosity index improving compositions.

BACKGROUND OF THE INVENTION

Olefin copolymers, including semi crystalline ethylene-propylene copolymers, have been widely used as a class of viscosity index improvers for lubricating oils. In these uses, the performance of these polymers is typically measured by the ratio of the thickening efficiency (TE) to the shear stability index (SSI). Olefin copolymers with an SSI of from about 35% to about 50% are typically known as high SSI viscosity index improvers, and are known to deliver exceptional fuel economy and thickening power, compared to lower SSI materials.

These olefin copolymers, however, are generally deficient in low temperature properties and exhibit inadequate "flowability" and "pumpability" as measured by pour point, and low temperature viscosity in a Mini Rotary Viscometer (MRV) test. Furthermore, high ethylene olefin copolymers are generally unsuitable for waxy base stock oils, especially Group I AC 150 oils.

Semi crystalline ethylene-propylene copolymers having ethylene contents of 53% to 57 wt % that are made in a single catalyst, single reactor environment, however, typically gel at low temperatures or have unacceptably high MRV or Cold Cranking Simulator (CCS) viscosity values. If the ethylene content is lower (such as 45% to 50 wt %) the single catalyst, single reactor polymers are very difficult to handle because of their amorphous nature and their tendency to agglomerate and stick to the finishing equipment.

To avoid these drawbacks, more complicated and cumbersome processes, including shear processes, bimodal blends, and blocky copolymers, have been used. Some illustrative processes are described in U.S. Pat. Nos. 4,540,753; 4,804,794; 5,391,617; 5,451,630; 5,451,636; 5,837,773; 6,753,381; U.S. Patent Publication No. 20030176579; WO2006102146; EP1148115; EP1178102; and EP1262498.

There is a need, therefore, for high SSI viscosity index improvers that exhibit excellent low temperature properties without detrimentally affecting fuel economy and thickening power, and that are stable in the finishing process in a single reactor environment (with single catalyst) without having to blend and shear the polymer or use other multiple step processes.

SUMMARY OF THE INVENTION

Provided are ethylene propylene copolymers, lubricating oil compositions, and methods for making the same. Compositions for lubricating oils include an ethylene copolymer comprising 40 wt % to 70 wt % of units derived from ethylene, and at least 30 wt % of units derived from at least one α-olefin having 3 to 20 carbon atoms. Preferably the ethylene copolymer is prepared in a single reactor. The composition can have a melting point (Tm) in ° C., as measured by differential scanning calorimetry (DSC), that satisfies the relation: $Tm > 3.4 \times E - 180$, where E is the weight % of units derived from ethylene in the copolymer. The composition can also have a Mw/Mn ratio of about 1.5 to about 3.5. The composition can further have a content of Group 4 metals derived from catalyst of 25 ppm or less and a wt ppm Group 4 metals derived from catalyst to wt ppm Group 5 metals ratio of at least 3.

In at least one specific embodiment, the lubricating oil composition can include a base oil and an ethylene copolymer comprising 40 wt % to 70 wt % of units derived from ethylene; and at least 30 wt % of units derived from at least one α-olefin having 3 to 20 carbon atoms. The copolymer can have a melting point (Tm) in ° C., as measured by DSC, that satisfies the relation: $Tm > 3.4 \times E - 180$, where E is the weight % of units derived from ethylene in the copolymer. The copolymer can also have a ratio of Mw/Mn of about 1.5 to about 3.5. The copolymer can further have a content of Group 4 metals derived from catalyst of 25 ppm or less and a ratio of wt ppm Group 4 metals derived from catalyst to wt ppm Group 5 metals derived from catalyst of at least 3.

In at least one other specific embodiment, the lubricating oil composition can include a base oil and an ethylene copolymer comprising 40 wt % to 70 wt % of units derived from ethylene and at least 12 wt % of units derived from at least one α-olefin having 3 to 20 carbon atoms. The copolymer can have a weight-average molecular weight (Mw), as measured by GPC, in the range of about 50,000 to about 200,000 g/mol. The copolymer can also have a melting point (Tm), as measured by DSC, of at least 100° C. The copolymer can further have a ratio of Mw/Mn of about 1.5 to about 3.5. The copolymer can also have a content of Group 4 metals derived from catalyst of 25 ppm or less and a ratio of wt ppm Group 4 metals derived from catalyst to wt ppm Group 5 metals derived from catalyst of at least 3.

In at least one specific embodiment, the method for making a lubricating oil composition, can include reacting ethylene and propylene in the presence of m-dimethylsilyl,bisindenyl hafnium dimethyl and trimethylammonium tetrakis-pentafluorophenylborate at conditions sufficient to produce a semicrystalline copolymer comprising 40 wt % to 70 wt % of units derived from ethylene and at least 12 wt % of units derived from at least one α-olefin having 3 to 20 carbon atoms. The semicrystalline copolymer can have a weight-average molecular weight (Mw), as measured by GPC, in the range of about 50,000 to about 200,000 g/mol. The semicrystalline copolymer can also have a melting point (Tm), as measured by DSC, of at least 100° C. The semicrystalline copolymer can further have a ratio of Mw/Mn of about 1.5 to about 3.5. The semicrystalline copolymer can also have a content of Group 4 metals derived from catalyst of 25 ppm or less and a ratio of wt ppm Group 4 metals derived from catalyst to wt ppm Group 5 metals derived from catalyst of at least 3. The semicrystalline copolymer can be blended with a base oil in an amount sufficient to produce a lubricating oil composition.

DETAILED DESCRIPTION

High SSI viscosity index improvers comprising at least one olefin copolymer are provided as lubricating oil compositions comprising the high SSI viscosity index improvers. The high SSI viscosity index improver has a high shear stability index (SSI), is semicrystalline, and has outstanding low temperature properties in a lubricating oil formulation such as a low pour point, low temperature viscosity in a Mini Rotary Viscometer (MRV) test and no yield stress in an MRV test while exhibiting acceptable thickening efficiency. The high SSI viscosity index improver is also stable in the finishing process in a single reactor environment, i.e., with a single catalyst, without having to blend and shear the polymer or use other multiple step processes. As used herein "single reactor copolymer" and "copolymer prepared in a single reactor" means a copolymer prepared in a single reactor environment.

Surprising and unexpectedly, the high SSI viscosity index improver has good low temperature properties and is suitable for use in waxy base stock oils, such as Group I AC 150 oils. Equally surprising and unexpected, the high SSI viscosity index improver has a higher melting point at equal ethylene concentrations than what is known in the art. Consequently, oil compositions comprising the high SSI viscosity index improver do not gel. The catalyst system to produce the high SSI viscosity index improver can include: (i) a complex of a transition metal, often referred to as a metallocene, metallocene catalyst precursor, or catalyst precursor; and (ii) an activator. The metallocene compounds are preferably cyclopentadienyl derivatives of titanium, zirconium and hafnium. Preferred metallocenes (e.g., titanocenes, zirconocenes and hafnocenes) may be represented by the following formulae:

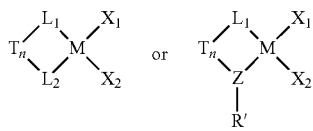

wherein M is the metal center, and is a Group 4 metal, preferably titanium, zirconium or hafnium, preferably zirconium or hafnium when $L_1$ and $L_2$ are present and preferably titanium when Z is present; n is 0 or 1;

T is an optional bridging group which, if present, in preferred embodiments is selected from dialkylsilyl, diarylsilyl, dialkylmethyl, ethylenyl (—$CH_2$—$CH_2$—) or hydrocarbylethylenyl wherein one, two, three or four of the hydrogen atoms in ethylenyl are substituted by hydrocarbyl, where hydrocarbyl can be independently $C_1$ to $C_{16}$ alkyl or phenyl, tolyl, xylyl and the like, and when T is present, the catalyst represented can be in a racemic or a meso form;

$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl, which are optionally substituted, in which any two adjacent R groups on these rings are optionally joined to form a substituted or unsubstituted, saturated, partially unsaturated, or aromatic cyclic or polycyclic substituent;

Z is nitrogen, oxygen or phosphorus (preferably nitrogen);

R' is a cyclic linear or branched $C_1$ to $C_{40}$ alkyl or substituted alkyl group (preferably Z—R' form a cyclododecylamido group); and $X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

By use of the term hafnocene is meant a bridged or unbridged, bis- or mono-cyclopentadienyl (Cp) hafnium complex having at least two leaving groups X1 and X2, which are as defined immediately above and where the Cp groups may be substituted or unsubstituted cyclopentadiene, indene or fluorene. By use of the term zirconocene is meant a bridged or unbridged, bis- or mono-Cp zirconium complex having at least two leaving groups X1 and X2, which are as defined immediately above and where the Cp groups may be substituted or unsubstituted cyclopentadiene, indene or fluorene. By use of the term titanocene is meant a bridged or unbridged, bis- or mono-Cp titanium complex having at least two leaving groups X1 and X2, which are as defined immediately above and where the Cp groups may be substituted or unsubstituted cyclopentadiene, indene or fluorene.

Among the metallocene compounds which can be used in this invention are stereorigid, chiral or asymmetric, bridged or non-bridged, or so-called "constrained geometry" metallocenes. See, for example, U.S. Pat. Nos. 4,892,851; 5,017,714; 5,132,281; 5,155,080; 5,296,434; 5,278,264; 5,318,935; 5,969,070; 6,376,409; 6,380,120; 6,376,412; WO-A-(PCT/US92/10066); WO 99/07788; WO-A-93/19103; WO 01/48034; EP-A2-0 577 581; EP-A1-0 578 838; WO 99/29743, and also the academic literature, see e.g., "The Influence of Aromatic Substituents on the Polymerization Behavior of Bridged Zirconocene Catalysts," Spaleck, W. et al, Organometallics 1994, Vol. 13, pp. 954-963, and "ansa-Zirconocene Polymerization Catalysts with Annelated Ring Ligands-Effects on Catalytic Activity and Polymer Chain Lengths," Brintzinger, H. et al, Organometallics 1994, Vol. 13, pp. 964-970, and documents referred to therein. The bridged metallocenes disclosed in WO 99/07788 and the unbridged metallocenes disclosed in U.S. Pat. No. 5,969,070 are particularly suitable for the present invention.

Preferably, the transition metal compound is a dimethylsilylbis(indenyl) metallocene, wherein the metal is a Group 4 metal, specifically, titanium, zirconium, or hafnium, and the indenyl may be substituted by one or more substituents selected from the group consisting of a halogen atom, C1 to C10 alkyl, C5 to C15 aryl, C6 to C25 arylalkyl, and C6 to C25 alkylaryl. More preferably, the metal is zirconium or hafnium, L1 and L2 are unsubstituted or substituted indenyl radicals, T is dialkylsiladiyl, and X1 and X2 are both halogen or C1 to C3 alkyl. Preferably, these compounds are in the rac-form.

Illustrative, but not limiting examples of preferred stereospecific metallocene compounds are the racemic isomers of dimethylsilylbis(indenyl) metal dichloride, -diethyl or -dimethyl, wherein the metal is titanium, zirconium or hafnium, preferably hafnium or zirconium. It is particularly preferred that the indenyl radicals are not substituted by any further substituents. However, in certain embodiments the two indenyl groups may also be replaced, independently of each other, by 2-methyl-4-phenylindenyl; 2-methyl indenyl; 2-methyl,4-[3',5'-di-t-butylphenyl]indenyl; 2-ethyl-4-[3',5'-di-t-butylphenyl]indenyl; 2-n-propyl-4-[3',5'-di-t-butylphenyl]indenyl; 2-iso-propyl-4-[3',5'-di-t-butylphenyl]indenyl; 2-iso-butyl-4-[3',5'-di-t-butylphenyl]indenyl; 2-n-butyl-4-[3',5'-di-t-butylphenyl]indenyl; 2-sec-butyl-4-[3',5'-di-t-butylphenyl]indenyl; 2-methyl-4-[3',5'-di-phenylphenyl]indenyl; 2-ethyl-4-[3',5'-di-phenylphenyl]indenyl; 2-n-propyl-4-[3',5'-di-phenylphenyl]indenyl; 2-iso-propyl-4-[3',5'-di-phenylphenyl]indenyl; 2-n-butyl-4-[3',5'-di-phenylphenyl]indenyl; 2-sec-butyl-4-[3',5'-di-phenylphenyl]indenyl; 2-tert-butyl-4-[3',5'-di-phenylphenyl]indenyl; and the like. Further illustrative, but not limiting examples of preferred stereospecific metallocene compounds are the racemic isomers of 9-silafluorenylbis(indenyl) metal dichloride, -diethyl or -dimethyl, wherein the metal is titanium, zirconium or hafnium. Again, unsubstituted indenyl radicals are particularly preferred. In some embodiments, however the two indenyl groups may be replaced, independently of each other, by any of the substituted indenyl radicals listed above.

Particularly preferred metallocenes as transition metal compounds for use in the catalyst systems of the present invention together with the activators of formula (1) or (2) defined above for use in polymerizing olefins are rac-dimethylsilylbis(indenyl) hafnocenes or -zirconocenes, rac-dimethylsilylbis(2-methyl-4-phenylindenyl) hafnocenes or -zirconocenes, rac-dimethylsilylbis(2-methyl-indenyl) hafnocenes or -zirconocenes, and rac-dimethylsilylbis(2-methyl-4-naphthylindenyl) hafnocenes or -zirconocenes, wherein the hafnium and zirconium metal is substituted, in addition to the bridged bis(indenyl) substituent, by two further substituents, which are halogen, preferably chlorine or bromine atoms, or alkyl groups, preferably methyl and/or ethyl groups. Preferably, these additional substituents are both chlorine atoms or both methyl groups. Particularly preferred transition metal compounds are dimethylsilylbis(indenyl)hafnium dimethyl, rac-dimethylsilylbis(indenyl)zirconium dimethyl, rac-ethylenylbis(indenyl)zirconium dimethyl, and rac-ethylenylbis(indenyl)hafnium dimethyl.

Illustrative, but not limiting examples of preferred non-stereospecific metallocene catalysts are: [dimethylsilanediyl(tetramethylcyclopentadienyl)-(cyclododecylamido)]metal dihalide, [dimethylsilanediyl(tetramethylcyclopentadienyl)(t-butylamido)]metal dihalide, [dimethylsilanediyl(tetramethylcyclopentadienyl)(exo-2-norbornyl)]metal dihalide, wherein the metal is Zr, Hf, or Ti, preferably Ti, and the halide is preferably chlorine or bromine.

In a preferred embodiment, the transition metal compound is a bridged or unbridged bis(substituted or unsubstituted indenyl) hafnium dialkyl or dihalide.

Finally, also non-metallocene compounds that are active in catalyzing olefin polymerization reactions are suitable as the transition metal compound in the catalyst systems and the processes of the present invention. A particularly preferred species of non-metallocene catalysts are the pyridyl amines disclosed e.g., in WO 03/040201.

Activators and Activation Methods for Catalyst Compounds

The transition metal compounds can be activated to yield the catalytically active, cationic transition metal compound having a vacant coordination site to which a monomer will coordinate and then be inserted into the growing polymer chain. In the process for polymerizing olefins according to the present invention, an activator of the following general formulae (1) or (2) is used to activate the transition metal compound:

Formula (1) is: $[R^1R^2R^3AH]^+[Y]^-$ (1)

wherein $[Y]^-$ is a non-coordinating anion (NCA) as further illustrated below,

A is nitrogen or phosphorus, $R^1$ and $R^2$ are hydrocarbyl groups or heteroatom-containing hydrocarbyl groups and together form a first, 3- to 10-membered non-aromatic ring with A, wherein any number of adjacent ring members may optionally be members of at least one second, aromatic or aliphatic ring or aliphatic and/or aromatic ring system of two or more rings, wherein said at least one second ring or ring system is fused to said first ring, and wherein any atom of the first and/or at least one second ring or ring system is a carbon atom or a heteroatom and may be substituted independently by one or more substituents selected from the group consisting of a hydrogen atom, halogen atom, $C_1$ to $C_{10}$ alkyl, $C_5$ to $C_{15}$ aryl, $C_6$ to $C_{25}$ arylalkyl, and $C_6$ to $C_{25}$ alkylaryl, and $R^3$ is a hydrogen atom or $C_1$ to $C_{10}$ alkyl, or $R^3$ is a $C_1$ to $C_{10}$ alkylene group that connects to said first ring and/or to said at least one second ring or ring system.

Formula (2) is: $[R_nAH]^+[Y]^-$ (2)

wherein $[Y]^-$ is a non-coordinating anion (NCA) as further illustrated below,

A is nitrogen, phosphorus or oxygen, n is 3 if A is nitrogen or phosphorus, and n is 2 if A is oxygen, and the groups R are identical or different and are a $C_1$ to $C_3$ alkyl group.

The present invention thus specifically relates to the new catalyst system itself, comprising a transition metal compound and an activator of the formula (1) shown above, to the use of an activator of said formula (1) for activating a transition metal compound in a catalyst system for polymerizing olefins, and to a process for polymerizing olefins the process comprising contacting under polymerization conditions one or more olefins with a catalyst system comprising a transition metal compound and an activator of formula (1).

The present invention also relates to a process for polymerizing olefins, the process comprising contacting, under polymerization conditions, one or more olefins with a catalyst system comprising a transition metal compound and an activator of formula (2) as shown above. In this process, the Mw of the polymer formed increases with increasing monomer conversion at a given reaction temperature.

Both the cation part of formulae (1) and (2) as well as the anion part thereof, which is an NCA, will be further illustrated below. Any combinations of cations and NCAs disclosed herein are suitable to be used in the processes of the present invention and are thus incorporated herein.

Activators—The Cations

The cation component of the activator of formulae (1) or (2) above is usually a protonated Lewis base capable of protonating a moiety, such as an alkyl or aryl, from the transition metal compound. Thus, upon release of a neutral leaving group (e.g., an alkane resulting from the combination of a proton donated from the cationic component of the activator and an alkyl substituent of the transition metal compound) a transition metal cation results, which is the catalytically active species.

In the polymerization process of the present invention an activator of above-depicted formula (2) may be used, wherein the cationic component has the formula [RnAH]+, wherein:

A is nitrogen, phosphorus or oxygen, n is 3 if A is nitrogen or phosphorus, and n is 2 if A is oxygen, and the groups R are identical or different and are a $C_1$ to $C_3$ alkyl group. $[RnAH]^+$ may thus be an ammonium, phosphonium or oxonium component, as A may be nitrogen, phosphorus or oxygen.

In one preferred embodiment of formula [RnAH]+, A is nitrogen or phosphorus, and thus n is 3, and the groups R are identical. More preferably, n is 3, and the groups R are all identically methyl, ethyl or propyl groups, more preferably [RnAH]+ is trimethylammonium or -phosphonium, triethylammonium or -phosphonium, tri(iso-propyl)ammonium or -phosphonium, tri(n-propyl)ammonium or -phosphonium. Trimethylammonium is particularly preferred. If [RnAH]+ is an oxonium compound (with n being 2), it is preferably the oxonium derivative of dimethyl ether, diethyl ether, tetrahydrofurane and dioxane.

In another embodiment, an activator of above-depicted formula (1) is used in the polymerization process of the present invention, the cationic component of which has the formula [R1R2R3AH]+, wherein A is nitrogen or phosphorus, R1 and R2 are hydrocarbyl groups or heteroatom-containing hydrocarbyl groups and together form a first, 3- to 10-membered non-aromatic ring with A, wherein any number, preferably two, three, four or five, more preferably two, of adjacent ring members may optionally be members of at least one second, aromatic or aliphatic ring or aliphatic and/or aromatic ring system of two or more rings, wherein said at least one second ring or ring system is fused to said first ring, and wherein any atom of the first and/or at least one second ring or ring system is a carbon atom or a heteroatom and may independently be substituted by one or more substituents selected from the group consisting of a hydrogen atom, halogen atom, C1 to C10 alkyl, preferably C1 to C5 alkyl, C5 to C15 aryl, preferably C5 to C10 aryl, C6 to C25 arylalkyl, and C6 to C25 alkylaryl, and R3 is a hydrogen atom or C1 to C10 alkyl or a C1 to C10 alkylene group that connects to said first ring and/or said at least one second ring or ring system. Since R1 and R2 may also be heteroatom (e.g., nitrogen, phosphorus or oxygen)-containing hydrocarbyl groups, the 3- to 10-membered ring they are forming with A and/or the at least one second ring or ring system may contain one or more additional heteroatoms (in addition to A), such as nitrogen and/or oxygen. Nitrogen is a preferred additional heteroatom that may be contained once or several times in said first ring and/or said at least one second ring or ring system. Any additional heteroatom, preferably nitrogen, may preferably be substituted independently by a hydrogen atom, or C1 to C5 alkyl.

One preferred embodiment of the cation in formula (1) is depicted in the following formula (1)':

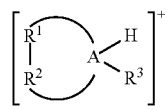
(1)'

In formula (1)' R1 and R2 together are a —(CH2)a- (i.e., alkylene) group with a being 3, 4, 5 or 6, and A is preferably nitrogen, R3 is a hydrogen atom or C1 to C10 alkyl, or R3 is a C1 to C10 alkylene group that connects to the ring formed by A, R1, and R2. In a specific embodiment, R3 is an alkylene group with 1, 2 or 3 carbon atoms which is connected to the ring formed by R1, R2 and A. R1, R2 and/or R3 may also be aza- or oxa-alkylene groups. R1 and R2 preferably form a 4-, 5-, 6- or 7-membered, non-aromatic ring with the nitrogen atom A.

Preferably, A in formula (1) or (1)' is nitrogen, and R1 and R2 together are a —(CH2)a- group (also referred to as "alkylene" group) with a being 3, 4, 5 or 6, or R1 and R2 may also be aza- or oxa-alkylene groups as mentioned above. R1 and R2 preferably form a 4, 5-, 6- or 7-membered, non-aromatic ring with the nitrogen atom A. Non-limiting examples of such ring are piperidinium, pyrrolidinium, piperazinium, indolinium, isoindolinium, imidazolidinium, morpholinium, pyrazolinium, etc. The additional substituent at A, R3, is in any of these cases preferably C1 to C5 alkyl, more preferably C1 to C4 alkyl, even more preferably C1 to C3 alkyl, and more preferably methyl or ethyl. R3 may also be a C1 to C5 alkylene group, preferably a C1 to C4 alkylene group, more preferably a C1 to C3 alkylene group and more preferably a —(CH2)3-, —(CH2)2 or —CH2— group that connects to the first ring containing R1, R2 and A and/or the at least second ring or ring system fused to the first ring. Thus, [R1R2R3AH]+ can also form a tricyclic structure, for example, but not limited to the following ones (which may be further substituted in one or more positions by any substituents mentioned above and may contain unsaturations, but are preferably not aromatic):

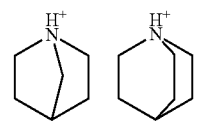

If additional heteroatoms are present in the first ring and/or the at least one second ring or ring system, structures like the following, nonlimiting example (which, again, may be further substituted by one or more substituents as mentioned above and may contain unsaturations, but are preferably not aromatic) may be used as the cation:

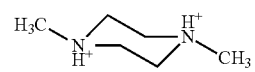

In another preferred embodiment, the ring formed by R1, R2 and A is fused to at least one other aliphatic or aromatic ring or ring system. For example, in the case that R1, R2 and A form a 5- or 6-membered aliphatic first ring with the heteroatom being phosphorus or nitrogen, one or more 5- or 6-membered aromatic rings or ring systems may be fused to said first ring via adjacent carbon atoms of the first ring.

In a preferred embodiment, [R1R2R3AH]+ is N-methylpyrrolidinium, N-methylpiperidinium, N-methyldihydroindolinium or N-methyldihydroisoindolinium.

In another preferred embodiment, the cation in formula (1) is depicted as one of the following four formulae (which are based upon formula (1) and are included when formula (1) is referred to herein):

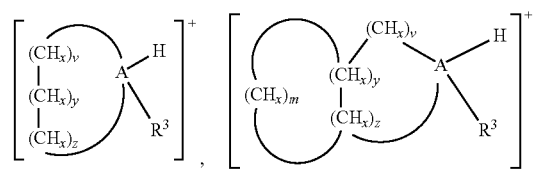

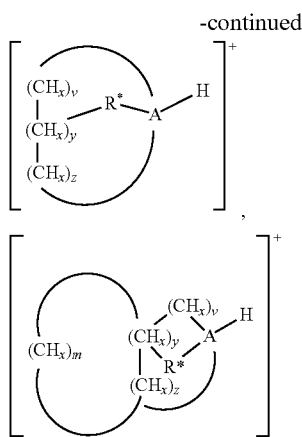

wherein each x is 0, 1 or 2, y is 3, 4, 5, 6, 7, 8, 9, or 10, (preferably 3, 4, 5, or 6), v is 1, 2, 3, 4, 5, 6, or 7 (preferably 0, 1, 2 or 3), z is 1, 2, 3, 4, 5, 6, or 7 (preferably 0, 1, 2 or 3), and v+y+z=3, 4, 5, 6, 7, 8, 9, or 10 (preferably v+y+z=3, 4, 5 or 6), m is 1, 2, 3, 4, 5, 6, 7, 8, 9 or 10 (preferably 1, 2, 3, or 4), A is nitrogen or phosphorus (preferably nitrogen), $R^3$ is a hydrogen atom or $C_1$ to $C_{10}$ alkyl, $R^*$ is a $C_1$ to $C_{10}$ alkyl, where any of the $(CH_x)$ groups may be substituted, independently, by one or more substituents selected from the group consisting of a halogen atom, $C_1$ to $C_{10}$ alkyl, $C_5$ to $C_{15}$ aryl, $C_6$ to $C_{25}$ arylalkyl, and $C_6$ to $C_{25}$ alkylaryl.

In another embodiment, at least one of the $(CH_x)$ groups is replaced by a heteroatom, preferably nitrogen. In a preferred embodiment, the rings depicted in the formulae above are saturated or partially unsaturated, but are preferably not aromatic. Alternately, the ring containing $(CH_x)_v$, $(CH_x)_y$, and $(CH_x)_z$ is not aromatic, while the ring containing $(CH_x)_m$ may or may not be aromatic.

The activator in the present process may also be a combination of at least two different activators of formulas (1) and/or (2). For example, two different ammonium components may be used at the same time with the same or different NCA's. Using two different cationic compounds in the activators according to formulas (1) and/or (2) can result in broadened MWDs and a broader range of melting points in the resulting polyolefins and can thus be used to tailor polymer properties. For example, N-methylpyrrolidinium and trimethylammonium may be used in combination together with the same NCA as defined below, particularly those such as tetrakis(pentafluorophenyl)borate and tetrakis(heptafluoronaphthyl)borate. Furthermore, in order to obtain the same effect as a mixture of cationic components, an activator with one cationic component may be used, while a second Lewis base may be added as a free base.

The Non-Coordinating Anion (NCA)

In the activators of formulae (1) and (2) above, [Y]− is a non-coordinating anion (NCA). The term "non-coordinating anion" means an anion that does not coordinate to the metal cation of the catalyst or that does coordinate to the metal cation, but only weakly. NCA's are usually relatively large (bulky) and capable of stabilizing the active catalyst species which is formed when the compound and the activator are combined. Said anion must still be sufficiently labile to be displaced by unsaturated monomers. Further, the anion will not transfer an anionic substituent or fragment to the cation of the transition metal compound as to cause it to form a neutral transition metal compound and a neutral by-product from the anion. Thus, suitable NCAs are those which are not degraded to neutrality when the initially formed complex decomposes.

Two classes of compatible NCAs useful herein have been disclosed e.g., in EP-A-0 277 003 and EP-A-0277 004. They include: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

The anion component [Y]− includes those having the formula $[M^{k+}Q_n]^{d-}$ wherein k is an integer from 1 to 3; n is an integer from 2 to 6; n−k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radical, said Q having up to 20 carbon atoms with the proviso that in not more than one occurrence is Q a halide (but more than one q may be a halide containing group). Preferably, each Q is a fluorinated hydrocarbyl having 1 to 20 carbon atoms, more preferably each Q is a fluorinated aryl group, and more preferably each Q is a perfluorinated aryl group. Examples of suitable [Y]− also include diboron compounds as those disclosed in U.S. Pat. No. 5,447,895.

[Y]− is preferably [B(R4)4]−, with R4 being an aryl group or a substituted aryl group, of which the one or more substituents are identical or different and are selected from the group consisting of alkyl, aryl, a halogen atom, halogenated aryl, and haloalkylaryl groups. Preferred examples of [Y]− for use in the present invention are: tetraphenylborate, tetrakis(pentafluorophenyl)borate, tetrakis-(2,3,4,6-tetrafluorophenyl)borate, tetrakis-(perfluoronaphthyl)borate (also referred to as tetrakis(heptafluoronaphthyl)borate), tetrakis(perfluorobiphenyl)borate, and tetrakis(3,5-bis(trifluoromethyl)phenyl)borate. Particularly preferred [Y]− are tetrakis(pentafluorophenyl)borate and tetrakis(heptafluoronaphthyl)borate.

Any of the NCA's [Y]− illustrated herein can be used in combination with any cation component of the activator of formula (1) or (2) as defined hereinabove. Thus, any combination of preferred components [Y]− and preferred components [R1R2R3AH]+ or [RnAH]+ are considered to be disclosed and suitable in the processes of the present invention.

Preferred Activators

Preferred activators of formula (1) in the catalyst systems of the present invention and used in the polymerization processes of the present invention are those wherein A is nitrogen, R1 and R2 together are a —(CH2)a- group with a being 3, 4, 5, or 6, and R3 is C1, C2, C3, C4 or C5 alkyl, and [Y]− is [B(R4)4]−, with R4 being an aryl group or a substituted aryl group, of which the one or more substituents are identical or different and are selected from the group consisting of alkyl, aryl, a halogen atom, halogenated aryl, and haloalkylaryl groups, and preferably R4 is a perhalogenated aryl group, more preferably a perfluorinated aryl group, more preferably pentafluorophenyl, heptafluoronaphthyl or perfluorobiphenyl. Preferably, these activators are combined with transition metal compound (such as a metallocene) to form the catalyst systems of the present invention.

Preferred activators in the catalyst systems of formula (2) in the catalyst systems used in the polymerization processes of the present invention are those wherein A is nitrogen, n is 3, all groups R are identical and are methyl, ethyl or isopropyl, and [Y]− is [B(R4)4]−, with R4 being an aryl group or a substituted aryl group, of which the one or more substituents are identical or different and are selected from the group consisting of alkyl, aryl, a halogen atom, halogenated aryl, and haloalkylaryl groups, and preferably R4 is a perhalogenated aryl group, more preferably a perfluorinated aryl group, more preferably pentafluorophenyl, heptafluoronaphthyl or perfluorobiphenyl. Preferably, these activators are combined with a transition metal compound (such as a metallocene) to form the catalyst systems of the present invention.

Preferred polymerization process utilize: (a) the preferred activators of formula (1) mentioned in the preceding paragraph, and/or (b) the activators of formula (2), wherein A is nitrogen, all R groups are identically methyl or ethyl, and wherein [Y]– is defined as in the preceding paragraph. These activators are preferably combined with a metallocene, e.g., as explained herein below, to form the catalyst systems used in the polymerization process of the present invention.

Preferred Catalyst Systems

Preferred combinations of transition metal compound and activator can include any of the following components:

- a metallocene compound, preferably a dialkylsilyl-bridged bis(indenyl) metallocene, wherein the metal is a group 4 metal and the indenyl is unsubstituted, or if substituted, is substituted by one or more substituents selected from the group consisting of a $C_1$ to $C_{10}$ alkyl, $C_5$ to $C_{15}$ aryl, $C_6$ to $C_{25}$ arylalkyl, and $C_6$ to $C_{25}$ alkylaryl; more preferably dimethylsilylbis(indenyl) metal dichloride or -dimethyl, ethylenylbis(indenyl) metal dichloride or -dimethyl, dimethylsilylbis(2-methyl-4-phenylindenyl) metal dichloride or -dimethyl, dimethylsilylbis(2-methyl-indenyl) metal dichloride or -dimethyl, and dimethylsilylbis(2-methyl-4-naphthylindenyl) metal dichloride or -dimethyl, wherein in all cases the metal may be zirconium or hafnium,
- a cationic component $[R1R2R3AH]^+$ wherein preferably A is nitrogen, $R^1$ and $R^2$ are together an —$(CH_2)_a$— group, wherein a is 3, 4, 5 or 6 and form, together with the nitrogen atom, a 4-, 5-, 6- or 7-membered non-aromatic ring to which, via adjacent ring carbon atoms, optionally one or more aromatic or heteroaromatic rings may be fused, and $R^3$ is $C_1$, $C_2$, $C_3$, $C_4$ or $C_5$ alkyl, more preferably N-methylpyrrolidinium or N-methylpiperidinium; or a cationic component $[R_nAH]^+$ wherein preferably A is nitrogen, n is 3 and all R are identical and are $C_1$ to $C_3$ alkyl groups, more preferably trimethylammonium or triethylammonium; and
- an anionic component $[Y]^-$ which is an NCA, preferably of the formula $[B(R^4)_4]^-$, with $R^4$ being an aryl group or a substituted aryl group, of which the one or more substituents are identical or different and are selected from the group consisting of alkyl, aryl, a halogen atom, halogenated aryl, and haloalkylaryl groups, preferably perhalogenated aryl groups, more preferably perfluorinated aryl groups, and more preferably pentafluorophenyl, heptafluoronaphthyl or perfluorobiphenyl.

More preferably, the activator can be trimethylammonium tetrakis(pentafluorophenyl)borate, N-methylpyrrolidinium tetrakis(pentafluorophenyl)borate, trimethylammonium tetrakis(heptafluoronaphthyl)borate, or N-methylpyrrolidinium tetrakis(heptafluoronaphthyl) borate. The metallocene is preferably rac-dimethylsilyl bis(indenyl)zirconium dichloride or -dimethyl, rac-dimethylsilyl bis(indenyl)hafnium dichloride or -dimethyl, rac-ethylenyl bis(indenyl)zirconium dichloride or -dimethyl or rac-ethylenyl bis(indenyl)hafnium dichloride or -dimethyl.

In another embodiment, a preferred transition metal compound comprises a bis indenyl compound represented by the formula:

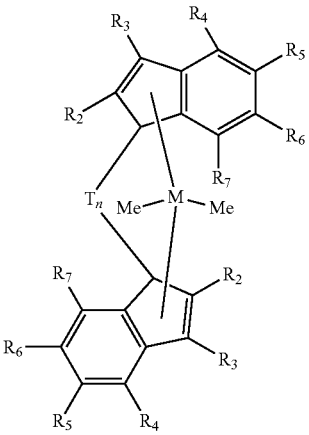

wherein M is a group 4 metal, preferably hafnium, T is a bridging group (such as an alkylene (methylene, ethylene) or a di substituted silyl or germyl group, (such as dimethyl silyl)), n is 0 or 1, $R_2$, $R_3$, $R_4$, $R_5$, $R_6$, and $R_7$ are hydrogen, a heteroatom, a substituted heteroatom group, a substituted or unsubstituted alkyl group, and a substituted or unsubstituted aryl group (preferably a substituted or unsubstituted alkyl or a substituted or unsubstituted aryl group). In a preferred embodiment $R_2$ is hydrogen. In another preferred embodiment $R_2$ and $R_4$ are hydrogen. In another preferred embodiment $R_2$ is hydrogen and $R_4$ is $C_1$ to $C_{20}$ alkyl (preferably methyl) or an aryl group (such as substituted or unsubstituted phenyl). In another preferred embodiment $R_2$ and $R_4$ are methyl. In another embodiment $R_2$ and $R_4$ are not methyl. In another embodiment $R_2$ is not methyl. In another preferred embodiment, $R_3$, $R_4$, $R_5$, $R_6$, and $R_7$ are hydrogen and $R_2$ is substituted or unsubstituted alkyl or substituted or unsubstituted aryl (preferably methyl). In another preferred embodiment, $R_2$, $R_3$, $R_5$, $R_6$, and $R_7$ are hydrogen and $R_4$ is substituted or unsubstituted alkyl or substituted or unsubstituted aryl (preferably methyl or phenyl).

Any catalyst system resulting from any combination of the preferred metallocene compound, preferred cationic component of the activator and preferred anionic component of the activator mentioned in the preceding paragraph shall be explicitly disclosed and may be used in accordance with the present invention in the polymerization of one or more olefin monomers. Also, combinations of two different activators can be used with the same or different metallocene(s).

Scavengers or Additional Activators

The catalyst systems may contain, in addition to the transition metal compound and the activator described above, one or more additional (additional activators or scavengers) as explained in the following.

A co-activator is a compound capable of alkylating the transition metal complex, such that when used in combination with an activator, an active catalyst is formed. Co-activators include alumoxanes as mentioned in the following, and aluminum alkyls as further listed below. An alumoxane is preferably an oligomeric aluminum compound represented by the general formula (Rx-Al—O)n, which is a cyclic compound, or Rx (Rx-Al—O)nAlRx2, which is a linear compound. Most common alumoxane is a mixture of the cyclic and linear compounds. In the general alumoxane formula, Rx is independently a C1-C20 alkyl radical, for example, methyl, ethyl, propyl, butyl, pentyl, isomers thereof, and the like, and "n" is an integer from 1-50. More preferably, Rx is methyl and "n" is at least 4. Methyl alumoxane (MAO) as well as modified MAO, referred to herein as MMAO, containing some higher alkyl groups to improve the solubility, ethyl alumoxane, isobutyl alumoxane and the like are useful herein. Particularly useful MAO can be purchased from Albemarle in a 10 wt % solution in toluene. Co-activators are typically only used in combination with Lewis acid activators and ionic activators when the pre-catalyst is not a dihydrocarbyl or dihydride complex.

In some embodiments of the invention, scavengers may be used to "clean" the reaction of any poisons that would otherwise react with the catalyst and deactivate it. Typical aluminum or boron alkyl components useful as scavengers are represented by the general formula $R_xJZ_2$ where J is aluminum or boron, $R_x$ is a C1-C20 alkyl radical, for example, methyl, ethyl, propyl, butyl, pentyl, and isomers thereof, and each Z is independently $R_x$ or a different univalent anionic ligand such as halogen (Cl, Br, I), alkoxide ($OR_x$) and the like. More preferred aluminum alkyls include triethylaluminum, diethylaluminum chloride, ethylaluminium dichloride, tri-iso-butylaluminum, tri-n-octylaluminum, tri-n-hexylaluminum, trimethylaluminum and combinations thereof. Preferred boron alkyls include triethylboron. Scavenging compounds may also be alumoxanes and modified alumoxanes including methylalumoxane and modified methylalumoxane.

Method of Preparing Catalyst System

The catalyst systems can be prepared according to methods known in the art. For obtaining the cations of the activators of formula (1) or (2) as defined hereinabove, for example, ammonium cations can be provided as salts that can be synthesized by the reaction of an amine with an acid in which the conjugate base of the acid remains as the counteranion or is exchanged with other anions. See "Organic Chemistry," Pine et al., 4th Edition, McGraw-Hill, 1980. A useful synthesis for example, is the reaction of a slight excess of HCl (as an Et2O solution) with the amine in hexanes resulting in the immediate precipitation of the amine hydrochloride. The chloride can be replaced by anion exchange with a suitable NCA according to the present invention. See references Chemische Berichte, 1955, Vol. 88, p. 962, or U.S. Pat. No. 5,153,157 and references therein. Phosphines and ethers are similarly protonated with acids and can undergo anion exchange reactions to the desired phosphonium salts, see for example, German Patent DE 2116439.

The catalyst systems may also include a support material or carrier. Generally the support is a porous material, for example, talc, or an inorganic oxide. Other suitable support materials include zeolites, clays, and organoclays.

Preferred support materials are inorganic oxides that include Group 2, 3, 4, 5, 13 or 14 metal oxides. Preferred supports include silica, which may or may not be dehydrated, fumed silica, alumina (WO 99/60033), silica-alumina and mixtures thereof. Other useful supports include magnesia, titania, zirconia, montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like.

It is preferred that the support material have a surface area in the range of from about 10 to about 700 m2/g, pore volume in the range of from about 0.1 to about 4.0 cc/g and average particle size in the range of from about 5 to about 500 µm. More preferably, the surface area of the support material is in the range of from about 50 to about 500 m2/g, pore volume of from about 0.5 to about 3.5 cc/g and average particle size of from about 10 to about 200 µm. More preferably the surface area of the support material is in the range is from about 100 to about 400 m2/g, pore volume from about 0.8 to about 3.0 cc/g and average particle size is from about 5 to about 100 µm. The average pore size of the carrier useful in the invention typically has pore size in the range of from 10 to 1000 Å, preferably 50 to about 500 Å, and more preferably 75 to about 350 Å.

Polymerization Process

Any known polymerization process may be used to produce the present copolymer. Polymerization methods include high pressure, slurry, gas, bulk, suspension, supercritical, solution phase, and combination thereof. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. By continuous process is meant that there is continuous addition to, and withdrawal of reactants and products from, the reactor system. Continuous processes can be operated in steady state, i.e., the composition of effluent remains fixed with time if the flow rate, temperature/pressure and feed composition remain invariant. For example, a continuous process to produce a polymer would be one where the reactants are continuously introduced into one or more reactors and polymer product is continuously withdrawn.

The catalyst systems described herein can be used advantageously in a homogeneous solution process. Generally this involves polymerization in a continuous reactor in which the polymer formed and the starting monomer and catalyst materials supplied are agitated to reduce or avoid concentration gradients. Some useful processes operate above the cloud point of the polymers at high pressures. Reaction environments include the case where the monomer(s) acts as diluent or solvent as well as the case where a liquid hydrocarbon is used as diluent or solvent. Preferred hydrocarbon liquids include both aliphatic and aromatic fluids such as desulphurized light virgin naphtha and alkanes, such as propane, isobutene, mixed butanes, hexane, pentane, isopentane, isohexane, cyclohexane, isooctane, and octane.

Temperature control in the reactor is typically obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature also depends on the catalyst used. In general, the reactor temperature is in the range from about 30° C. to about 250° C., preferably from about 60° C. to about 200° C. The pressure is generally in the range from atmospheric pressure up to high pressures such as about 300 MPa, about 200 MPa or about 100 MPa. Also lower pressures up to about 50, about 40, about 30, about 20 or about 15 MPa are suitable. The lower end of the possible pressure range may be anything from about 0.1 MPa, such as 0.5 MPa, about 1 MPa or about 2.0 MPa. In at least one specific embodiment, the reactor pressure is less than 600 pounds per square inch (psi) (4.14 MPa), or less than 500 psi (3.45 MPa) or less than 400 psi (2.76 MPa), or less than 300 psi (2.1 MPa), such as from about atmospheric pressure to about 400 psi (2.76 MPa). In another embodiment reactor pressure is from about 400 psi (2.76 MPa) to about 4000 psi (27.6 MPa), or from about 1000 psi (6.9 MPa) to 2000 psi (13.8 MPa), or from about 1200 psi (8.27 MPa) to 1800 psi (12.4 MPa).

The monomer concentration in the reactor (based on the entire reaction mixture) may be anywhere from very dilute up to using a monomer as the solvent. Suitable monomer concentrations may be, for example, up to about 2 mol/L, up to about 5 mol/L, up to about 10 mol/L, or even higher, such as up to about 15 mol/L.

High SSI Viscosity Improver

In one or more embodiments, the high SSI viscosity index improver can include ethylene and one or more other comonomers. Suitable comonomers include α-olefins having of from 3 to 20 carbon atoms. Suitable α-olefin comonomers can be linear or branched, and two or more α-olefin comonomers can be used, if desired. For example, suitable α-olefin comonomers can include any one or more linear C3-C12 α-olefins, and α-olefins having one or more C1-C3 alkyl branches. Specific examples include propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include propylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituents on any of C3-5, 1-pentene with two methyl substituents in any stoichiometrically acceptable combination on C3 or C4,3-ethyl-1-pentene, 1-octene, 1-pentene with a methyl substituents on any of C3 or C4,1-hexene with two methyl substituents in any stoichiometrically acceptable combination on C3-C5, 1-pentene with three methyl substituents in any stoichiometrically acceptable combination on C3 or C4,1-hexene with an ethyl substituents on C3 or C4,1-pentene with an ethyl substituents on C3 and a methyl substituents in a stoichiometrically acceptable position on C3 or C4, 1-decene, 1-nonene, 1-nonene with a methyl substituents on any of C3-C9, 1-octene with two methyl substituents in any stoichiometrically acceptable combination on C3-C7, 1-heptene with three methyl substituents in any stoichiometrically acceptable combination on C3-C6, 1-octene with an ethyl substituents on any of C3-C7, 1-hexene with two ethyl substituents in any stoichiometrically acceptable combination on C3 or C4, and 1-dodecene. Other suitable comonomers include internal olefins, such as cis 2-butene and trans 2-butene.

Other suitable comonomers can include one or more polyenes. The term "polyene" as used herein is meant to include monomers having two or more unsaturations; i.e., dienes, trienes, etc. Polyenes particularly useful as co-monomers are non-conjugated dienes, preferably are straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6 single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); (e) cycloalkenyl-substituted alkenes, such as vinyl cyclohexene, allyl cyclohexene, vinyl cyclooctene, 4-vinyl cyclohexene, allyl cyclodecene; and vinyl cyclododecene. Of the non-conjugated dienes typically used, the preferred dienes are dicyclopentadiene (DCPD), 1,4-hexadiene, 1,6-octadiene; 5-methyl-1,4-hexadiene; 3,7-dimethyl-1,6-octadiene; 5-methylene-2-norbornene, 5-ethylidene-2-norbornene (ENB), and tetracyclo (Δ-11,12) 5,8 dodecene. Note that throughout this application the terms "polyene", "non-conjugated diene" and "diene" are used interchangeably. It is preferred to use dienes which do not lead to the formation of long chain branches. For successful use as VI improver non- or lowly branched polymer chains are preferred. Other polyenes that can be used include cyclopentadiene and octatetra-ene.

The high SSI viscosity index improver preferably has of from about 40 wt % to about 70 wt % ethylene derived units. The high SSI viscosity index improver can also have of from about 50 wt % to about 60 wt % ethylene derived units. In some embodiments, the ethylene content can range from a low of about 40 wt %, 42 wt %, or 44 wt % to a high of about 50 wt %, 56 wt %, or 58 wt %. The ethylene content also can range from a low of about 40 wt %, 45 wt %, or 50 wt % to a high of about 58 wt %, 65 wt %, or 70 wt %.

The high SSI viscosity index improver preferably has of from about 10 wt % to about 60 wt % comonomer derived units. The high SSI viscosity index improver can also include of from about 20 wt % to about 55 wt % comonomer derived units. In some embodiments, the comonomer content can range from a low of about 10 wt %, 15 wt %, or 25 wt % to a high of about 45 wt %, 55 wt %, or 60 wt %. In some embodiments, the comonomer content can be at least 12 wt %, at least 15 wt %, at least 18 wt %, at least 20 wt %, at least 25 wt %, at least 30 wt %, or at least 35 wt %.

Physical Properties

The high SSI viscosity index improver can have a shear stability index (SSI) of from about 30% to about 55%; from about 35% to about 50%; or from about 40% to about 50%. The high SSI viscosity index improver can also have a shear stability index (SSI) ranging from a low of about 30%, about 32%, or about 34% to a high of about 47%, about 50%, or about 53%. The high SSI viscosity index improver can also have a shear stability index (SSI) ranging from a low of about 30%, about 34%, or about 38% to a high of about 42%, about 46%, or about 50%. The high SSI viscosity index improver can also have a shear stability index (SSI) and a thickening efficiency (TE), satisfying the relation: TE>0.034*SSI+0.7; TE>0.034*SSI+0.8; or TE>0.034*SSI+0.9; or TE>0.034*SSI+1.0; TE>0.034*SSI+1.1; or TE>0.034*SSI+1.2.

In one or more embodiments, the high SSI viscosity index improver can have a melt flow rate ("MFR") as measured by ASTM 1238D (230° C., 2.16 kg) of from about 3 g/10 min to about 25 g/10 min. The MFR can also be from about 3 g/10 min to about 20 g/10 min, from about 5 g/10 min to about 15 g/10 min, or from about 6 g/10 min to about 12 g/10 min. The high SSI viscosity index improver can further have a MFR of from about 0.8 g/10 min to about 25 g/10 min, from about 0.9 g/10 min to about 15 g/10 min, or from about 1.5 g/10 min to about 10 g/10 min. In one or more embodiments, the high SSI viscosity index improver can have a MFR ranging from a low of about 0.8 g/10 min, about 0.9 g/10 min, about 1 g/10 min, or about 1.1 g/10 min to a high of about 5 g/10 min, about 7 g/10 min, about 9 g/10 min, or about 12 g/10 min.

In one or more embodiments, the high SSI viscosity index improver can have a high load melt flow rate ("HLMFR") as measured by ASTM 1238D (230° C., 21.6 kg) of from about 50 to about 1000 g/10 min. The HLMFR can also be from about 100 to about 800 g/10 min, from about 100 to about 600 g/10 min, or from about 100 to about 500 g/10 min. In one or more embodiments, the HLMFR is from about 100 to about 1000 g/10 min; or from about 200 to about 600 g/10 min.

In one or more embodiments, the high SSI viscosity index improver can have a ratio of the melt flow rate at 21.6 kg; 230° C. to the melt flow rate at 2.16 kg; 230° C. (MFRR) of about 30 or more. Preferably, the MFRR is more than 35, more than 40 or more than 42. In one or more embodiments, the high SSI viscosity index improver can have a ratio of the melt flow rate at 21.6 kg; 230° C. to the melt flow rate at 2.16 kg; 230° C. (MFRR) of about 200 or less. Preferably, the MFRR is less than 100, less than 80 or less than 60. In one or more embodiments, the MFRR can range from a low of about 25, 30, or 35 to a high of about 45, 70, or 85. In one or more embodiments, the MFRR can range from a low of about 22, 32, or 42 to a high of about 52, 62, or 72.

In one or more embodiments, the high SSI viscosity index improver can have a weight-average molecular weight (Mw), as measured by GPC, of about 50,000 g/mol to about 200,000 g/mol; of from about 60,000 g/mol to about 210,000 g/mol; or of from about 70,000 g/mol to about 195,000 g/mol. In one or more embodiments, the high SSI viscosity index improver can have a Mw, as measured by GPC, ranging from a low of about 50,000 g/mol, about 55,000 g/mol, about 60,000 g/mol, or about 65,000 g/mol to a high of about 180,000 g/mol, about 190,000 g/mol, about 200,000 g/mol, or about 205,000 g/mol.

In one or more embodiments, the high SSI viscosity index improver can have a Mw/Mn ("MWD") of about 5.0 or less, or about 4.0 or less, or 3.0 or less, or 2.2 or less, as measured by GPC. In one or more embodiments, the Mw/Mn is from less than 2.8, or less than 2.6, or less than 2.4, or less than 2.3, or less than 2.2. In one or more embodiments, the Mw/Mn is of from about 1.0 to about 3.0; of from about 1.5 to about 2.5; of from about 2.0 to about 2.4; or of from about 2.1 to about 2.3. In one or more embodiments, the Mw/Mn can be from about 1.5 to about 3.0; of from about 1.5 to about 3.5; of from about 1.5 to about 4.0, or of from about 1.8 to about 3.3.

Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyrogel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from known expressions. The desired MWD function (e.g., Mw/Mn or Mz/Mw) is the ratio of the corresponding M values. Measurement of M and MWD is well known in the art and is discussed in more detail in, for example, Slade, P. E. Ed., Polymer Molecular Weights Part II, Marcel Dekker, Inc., NY, (1975) 287-368; Rodriguez, F., Principles of Polymer Systems 3rd Ed., Hemisphere Pub. Corp., NY, (1989) 155-160; U.S. Pat. No. 4,540,753; Ver Strate et al., Macromolecules, Vol. 21, (1988) pp. 3360-3371, each of which is incorporated herein by reference.

Further, since the high SSI viscosity index improver are produced using a metallocene-based, rather than a Ziegler Natta, catalyst system they contain no more than about 25 ppm of Group 4 metals derived from catalyst and a ratio of wt ppm Group 4 metals derived from catalyst to wt ppm Group 5 metals derived from catalyst of at least 3. In one or more embodiments, the high SSI viscosity index improver can have a content of Group 4 metals of 25 ppm or less, 20 ppm or less, 15 ppm or less, 10 ppm, or 5 ppm or less. In one or more embodiments, the high SSI viscosity index improver can have a wt ppm Group 4 metals to wt ppm Group 5 metals ratio of at least 2.8, at least 2.9, at least 3.0, at least 3.1, at least 3.2, at least 3.3, at least 3.4, or at least 3.5. And since the high SSI viscosity index improver can be produced without using the chain shuttling polymerization process disclosed in, for example, U.S. Patent Application Publication No. 20070167315, the copolymers typically contain no more than 25 ppm, such as no more than 10 ppm, of Zn. The presence of Group 4 and Group 5 metals and/or zinc in the high SSI viscosity index improver may be measured using Inductively Coupled Plasma Atomic Emission Spectroscopy (ICP-AES); a technique that is commonly known in the art. For ICP-AES measurements, the samples to be measured are first ashed, then dissolved in an appropriate acidic solution, followed by appropriate dilution to fall within the standard calibration curve. A suitable instrument is the IRIS ADVANTAGE DUAL VIEW instrument manufactured by Thermo Electron Corporation (now Thermo Fisher Scientific Inc. 81 Wyman Street Waltham, Mass. 02454).

In one embodiment, the high SSI viscosity index improver comprises 40 wt % to 70 wt %, more preferably 40 wt % to 60 wt % of units derived from ethylene and at least 30 wt %, more preferably 60 wt % to 40 wt %, of units derived from at least one α-olefin having 3 to 20 carbon atoms. Even with such a relatively low ethylene content, the copolymers have a melting point (Tm) in ° C., as measured by DSC, that satisfies the relation:

$$Tm > 3.4 \times E - 180$$

where E is the weight % of units derived from ethylene in the copolymer so that, for example, with a copolymer containing 55 wt % ethylene, for example, the Tm is greater than 7° C. In certain cases, the high SSI viscosity index improver has a melting point (Tm) in ° C., as measured by DSC, that satisfies the relation: $Tm > 3.4 \times E - 170$, or the relation: $Tm > 3.4 \times E - 160$, where E is as defined above.

Lubricating Oil Compositions

Lubricating oil compositions containing the high SSI viscosity index improver and one or more base oils are also provided. The base oil can be or include natural or synthetic oils of lubricating viscosity, whether derived from hydrocracking, hydrogenation, other refining processes, unrefined processes, or re-refined processes. The base oil can be or include used oil. Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils.

In one embodiment, the base oil is or includes a polyalphaolefin (PAO) including a PAO-2, PAO-4, PAO-5, PAO-6, PAO-7 or PAO-8 (the numerical value relating to Kinematic Viscosity at 100° C.). Preferably, the polyalphaolefin is prepared from dodecene and/or decene. Generally, the polyalphaolefin suitable as an oil of lubricating viscosity has a viscosity less than that of a PAO-20 or PAO-30 oil. In one or more embodiments, the base oil can be defined as specified in the American Petroleum Institute (API) Base Oil Interchangeability Guidelines. For example, the base oil can be or include an API Group I, II, III, IV, V oil or mixtures thereof.

In one or more embodiments, the base oil can include oil or blends thereof conventionally employed as crankcase lubricating oils. For example, suitable base oils can include crankcase lubricating oils for spark-ignited and compression-ignited internal combustion engines, such as automobile and truck engines, marine and railroad diesel engines, and the like. Suitable base oils can also include those oils conventionally employed in and/or adapted for use as power transmitting fluids such as automatic transmission fluids, tractor fluids, universal tractor fluids and hydraulic fluids, heavy duty hydraulic fluids, power steering fluids and the like. Suitable base oils can also be or include gear lubricants, industrial oils, pump oils and other lubricating oils.

In one or more embodiments, the base oil can include not only hydrocarbon oils derived from petroleum, but also include synthetic lubricating oils such as esters of dibasic acids; complex esters made by esterification of monobasic acids, polyglycols, dibasic acids and alcohols; polyolefin oils, etc. Thus, the lubricating oil compositions described can be suitably incorporated into synthetic base oils such as alkyl esters of dicarboxylic acids, polyglycols and alcohols; poly-alpha-olefins; polybutenes; alkyl benzenes; organic esters of phosphoric acids; polysilicone oils; etc. The lubricating oil composition can also be utilized in a concentrate form, such as from 1 wt % to 49 wt % in oil, e.g., mineral lubricating oil, for ease of handling, and may be prepared in this form by carrying out the reaction of the invention in oil as previously described.

In one or more embodiments, the lubricating oil composition can have a pour point of about −30° C. or less; of about −33° C. or less; of about −35° C. or less; of about −37° C. or less; of about −40° C. or less; of about −43° C. or less; of about −45° C. or less; or of about −47° C. or less. The lubricating oil composition can also have a pour point of from about −60° C. to about −30° C.; of from about −55° C. to about −35° C.; of from about −50° C. to about −35° C.; or of from about −45° C. to about −35° C. The lubricating oil composition can also have a pour point ranging from a low of about −75° C., about −65° C., about −55° C., or about −50° C. to a high of about −40° C., about −35° C., about −30° C.

In one or more embodiments, the lubricating oil composition can have a shear stability index (SSI) of about 35% to about 50% and a pour point of about −35° C. or less. In one or more embodiments, the lubricating oil composition can have a shear stability index (SSI) of about 35% to about 50% and a pour point of about −40° C. or less. In one or more embodiments, the lubricating oil composition can have a shear stability index (SSI) of about 35% to about 50% and a pour point of about −45° C. or less.

In one or more embodiments, the lubricating oil composition can have a low temperature viscosity in a Mini Rotary Viscometer (MRV) test at −25° C. of about 25,000 cP or less, of about 22,000 cP or less, of about 20,000 cP or less, of about 19,000 cP or less, of about 18,000 cP or less, of about 17,000 cP or less, of about 16,000 cP or less, or of about 15,000 cP or less. In one or more embodiments, the lubricating oil composition can have a low temperature viscosity in a Mini Rotary Viscometer (MRV) test at −25° C. of from about 5,000 cP to about 25,000 cP, of from about 6,000 cP to about 20,000 cP, or of from about 8,000 cP to about 19,000 cP.

Conventional Oil Additives

The lubricating oil composition can optionally contain one or more conventional additives, such as, for example, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative corrosion inhibitors include phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a C2 to C6 olefin polymer such as polyisobutylene, with from 5 to 30 wt % of a sulfide of phosphorus for ½ to 15 hours, at a temperature in the range of 66° C. to 316° C. Neutralization of the phosphosulfurized hydrocarbon may be effected by processes known to those skilled in the art.

Oxidation inhibitors, or antioxidants, reduce the tendency of mineral oils to deteriorate in service, as evidenced by the products of oxidation such as sludge and varnish-like deposits on the metal surfaces, and by viscosity growth. Such oxidation inhibitors include alkaline earth metal salts of alkylphenolthioesters having C5 to C12 alkyl side chains, e.g., calcium nonylphenate sulfide, barium octylphenate sulfide, dioctylphenylamine, phenylalphanaphthylamine, phosphosulfurized or sulfurized hydrocarbons, etc. Other oxidation inhibitors or antioxidants useful in this invention include oil-soluble copper compounds, such as described in U.S. Pat. No. 5,068,047.

Friction modifiers serve to impart the proper friction characteristics to lubricating oil compositions such as automatic transmission fluids. Representative examples of suitable friction modifiers are found in U.S. Pat. No. 3,933,659, which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. Preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid, thus preventing sludge flocculation and precipitation or deposition on metal parts. Suitable dispersants include high molecular weight N-substituted alkenyl succinimides, the reaction product of oil-soluble polyisobutylene succinic anhydride with ethylene amines such as tetraethylene pentamine and borated salts thereof. High molecular weight esters (resulting from the esterification of olefin substituted succinic acids with mono or polyhydric aliphatic alcohols) or Mannich bases from high molecular weight alkylated phenols (resulting from the condensation of a high molecular weight alkylsubstituted phenol, an alkylene polyamine and an aldehyde such as formaldehyde) are also useful as dispersants. Pour point depressants ("ppd"), otherwise known as lube oil flow improvers, lower the temperature at which the fluid will flow or can be poured. Any suitable pour point depressant known in the art can be used. For example, suitable pour point depressants include, but are not limited to, one or more C8 to C18 dialkylfumarate vinyl acetate copolymers, polymethyl methacrylates, alkylmethacrylates and wax naphthalene.

Foam control can be provided by any one or more antifoamants. Suitable ant-foamants include polysiloxanes, such as silicone oils and polydimethyl siloxane.

Anti-wear agents reduce wear of metal parts. Representatives of conventional antiwear agents are zinc dialkyldithiophosphate and zinc diaryldithiosphate, which also serves as an antioxidant.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents.

Compositions when containing these conventional additives are typically blended into the base oil in amounts which are effective to provide their normal attendant function. Thus, typical formulations can include, in amounts by weight, a VI improver (0.01-12%); a corrosion inhibitor (0.01-5%); an oxidation inhibitor (0.01-5%); depressant (0.01-5%); an antifoaming agent (0.001-3%); an anti-wear agent (0.001-5%); a friction modifier (0.01-5%); a detergent/rust inhibitor (0.01-10%); and a base oil.

When other additives are used, it may be desirable, although not necessary, to prepare additive concentrates comprising concentrated solutions or dispersions of the viscosity index improver (in concentrate amounts hereinabove described), together with one or more of the other additives, such a concentrate denoted an "additive package," whereby several additives can be added simultaneously to the base oil to form a lubricating oil composition. Dissolution of the additive concentrate into the lubricating oil may be facilitated by solvents and by mixing accompanied with mild heating, but this is not essential. The additive-package will typically be formulated to contain the viscosity index improver and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from 2.5 to 90%, preferably from 5 to 75%, and still more preferably from 8 to 50 wt % additives in the appropriate proportions with the remainder being base oil. The final formulations may use typically about 10 wt % of the additive-package with the remainder being base oil.

In at least one specific embodiment, the lubricating oil composition can include: one or more high SSI viscosity index improvers in an amount of from 0.1 wt % to 20 wt %; one or more base oils in an amount of from 1 wt % to 99 wt %; one or more dispersants in an amount of from 0.01 wt % to 25 wt %; and optionally one or more other additives in an amount of from 0.01 wt % to 20 wt %, based on total weight of the lubricating oil composition. The amount of the high SSI viscosity index improver can also range form from a low of about 0.1 wt %, 0.5 wt %, 1 wt %, 2 wt % to a high of about 10 wt %, 15 wt %, 18 wt %, or 20 wt %. In at least one specific embodiment, the one or more base oils can be present in an amount of from 1 wt % to 99 wt %; or 50 wt % to 99 wt %; or 53 wt % to 90 wt %; or 60 wt % to 90 wt %. In at least one specific embodiment, the one or more dispersants can be present in an amount of from 0.5 wt % to 20 wt %; or 1.0 wt % to 18 wt %; or 3.0 wt % to 15 wt %; or 5 wt % to 14 wt %; or 5.0 wt % to 10 wt %. In at least one specific embodiment, the one or more additives, when present, can range of from 0.05 wt % to 10 wt %; or 0.7 wt % to 5 wt %; or 0.75 wt % to 5 wt %; or 0.5 wt % to 3 wt %; or 0.75 wt % to 3 wt %. Such weight percentages are based on the total weight of the oil composition.

EXAMPLES

The invention will now be more particularly described with reference to the Examples and the accompanying drawing.

In the Examples below, weight-average and number-average molecular weights were determined by GPC using a Waters Alliance 2000 gel permeation chromatograph equipped with a Waters differential refractometer that measures the difference between the refractive index of the solvent and that of the solvent containing the fractionated polymer. The system was used at 145° C. with 1,2,4-Trichlorobenzene (TCB) as the mobile phase that was stabilized with ~250 ppm of butylated hydroxy toluene (BHT). The flow rate used was 1.0 mL/min. Three (Polymer Laboratories) PLgel Mixed-B columns were used. This technique is discussed in Macromolecules, Vol. 34, No. 19, pp. 6812-6820 and Macromolecules Vol. 37, No. 11, pp. 4304-4312, both of which are incorporated herein by reference.

The separation efficiency of the column set was calibrated using a series of narrow molecular weight distribution polystyrene standards, which reflects the expected molecular weight range for samples and the exclusion limits of the column set. At least 10 individual polystyrene standards, ranging from Mp ~580 to 10,000,000, were used to generate the calibration curve. The polystyrene standards were obtained from Polymer Laboratories (Amherst, Mass.) or an equivalent source. To assure internal consistency, the flow rate was corrected for each calibrant run to give a common peak position for the flow rate marker (taken to be the positive inject peak) before determining the retention volume for each polystyrene standard. The flow marker peak position thus assigned was also used to correct the flow rate when analyzing samples; therefore, it is an essential part of the calibration procedure. A calibration curve (log Mp vs. retention volume) was generated by recording the retention volume at the peak in the DRI signal for each PS standard, and fitting this data set to a second order polynomial. Polystyrene standards were graphed using Viscotec 3.0 software. Samples were analyzed using WaveMetrics, Inc. IGOR Pro and Viscotec 3.0 software using updated calibration constants.

Peak melting point (Tm) and peak crystallization temperature (Tc), glass transition temperature (Tg), and heat of fusion (ΔH) were determined using the following procedure according to ASTM D3418-03. Differential scanning calorimetric (DSC) data were obtained using a Perkin Elmer Pyris 1 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 5 minutes then cooled down to −100° C. at a rate of 10° C./minute before a second cooling-heating cycle was applied. Both the first and second cycle thermal events were recorded. Areas under the endothermic peaks of the 2nd melting curve were measured and used to determine the heat of fusion. The melting and crystallization temperatures reported here were obtained during the second heating/cooling cycle.

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 cm-1 to 4000 cm-1 was recorded and the area under the propylene band at ~1165 cm-1 and the area under the ethylene band at ~732 cm-1 in the spectrum were calculated. The baseline integration range for the methylene rocking band is nominally from 695 cm-1 to the minimum between 745 and 775 cm-1. For the polypropylene band the baseline and integration range is nominally from 1195 to 1126 cm-1. The ethylene content in wt % was calculated according to the following equation:

$$\text{ethylene content(wt. \%)} = 72.698 - 86.495X + 13.696X^2$$

where $X=AR/(AR+1)$ and AR is the ratio of the area for the peak at ~1165 cm-1 to the area of the peak at ~732 cm-1.

The present invention can be further described as follows:

Embodiment 1: A composition, preferably for lubricating oil, comprising an ethylene copolymer comprising 40 wt % to 70 wt % of units derived from ethylene, and at least 30 wt % of units derived from at least one α-olefin having 3 to 20 carbon atoms, wherein the composition has:
  a melting point (Tm) in ° C., as measured by DSC, that satisfies the relation:

$$Tm > 3.4 \times E - 180$$

where E is the weight % of units derived from ethylene in the copolymer and the ethylene copolymer has:
  a Mw/Mn ratio of about 1.5 to about 3.5; and
  a content of Group 4 metals derived from a catalyst of 25 ppm or less.

Embodiment 2: The composition of embodiment 1, wherein the ethylene copolymer has a ratio of wt ppm Group 4 metals derived from a catalyst to wt ppm Group 5 metals derived from a catalyst of at least 3.

Embodiment 3: The composition of embodiment 1 or 2, wherein the ethylene copolymer has a weight-average molecular weight (Mw), as measured by GPC, of about 50,000 g/mol to about 200,000 g/mol.

Embodiment 4: The composition of any of embodiments 1-3, further comprising a shear stability index, SSI, and a thickening efficiency, TE, satisfying the relation: TE>0.034*SSI+0.8.

Embodiment 5: The composition of any of embodiments 1-4, further comprising a shear stability index, SSI, and a thickening efficiency, TE, satisfying the relation: TE>0.034*SSI+1.0.

Embodiment 6: The composition of any of embodiments 1-5, further comprising a shear stability index, SSI, and a thickening efficiency, TE, satisfying the relation: TE>0.034*SSI+1.1.

Embodiment 7: The composition of any of embodiments 1-6, further comprising a pour point of about −40° C. or less.

Embodiment 8: The composition of any of embodiments 1-7, further comprising a low temperature viscosity in a Mini Rotary Viscometer (MRV) test at −25° C. of about 20,000 cP or less.

Embodiment 9: The composition of any of embodiments 1-8, further comprising a shear stability index, SSI, of about 35% to about 50%.

Embodiment 10: The composition of any of embodiments 1-9, further comprising a pour point of about −35° C. or less.

Embodiment 11: A lubricating oil composition, comprising:
  a base oil; and
  an ethylene copolymer comprising 40 wt % to 70 wt % of units derived from ethylene; and at least 30 wt % of units derived from at least one α-olefin having 3 to 20 carbon atoms, wherein the copolymer has:
  a melting point (Tm) in ° C., as measured by DSC, that satisfies the relation:

$$Tm > 3.4 \times E - 180$$

where E is the weight % of units derived from ethylene in the copolymer;
  a ratio of Mw/Mn of about 1.5 to about 3.5; and
  a content of Group 4 metals derived from a catalyst of 25 ppm or less.

Embodiment 12: The lubricating oil composition of embodiment 11, wherein the ethylene copolymer has a ratio of wt ppm Group 4 metals derived from a catalyst to wt ppm Group 5 metals derived from a catalyst of at least 3.

Embodiment 13: The lubricating oil composition of embodiment 11 or 12, wherein the ethylene copolymer has a weight-average molecular weight (Mw), as measured by GPC, of about 50,000 g/mol to about 200,000 g/mol.

Embodiment 14: The lubricating oil composition of any of embodiments 11-13, further comprising a shear stability index, SSI, and a thickening efficiency, TE, satisfying the relation: TE>0.034*SSI+0.8.

Embodiment 15: The lubricating oil composition of any of embodiments 11-14, further comprising a shear stability index, SSI, and a thickening efficiency, TE, satisfying the relation: TE>0.034*SSI+1.0.

Embodiment 16: The lubricating oil composition of any of embodiments 11-15, further comprising a shear stability index, SSI, and a thickening efficiency, TE, satisfying the relation: TE>0.034*SSI+1.1.

Embodiment 17: The lubricating oil composition of any of embodiments 11-16, further comprising a pour point of about −40° C. or less.

Embodiment 18: The lubricating oil composition of any of embodiments 11-17, further comprising a low temperature viscosity in a Mini Rotary Viscometer (MRV) test at −25° C. of about 20,000 cP or less.

Embodiment 19: The lubricating oil composition of any of embodiments 11-18, further comprising a shear stability index, SSI, of about 35% to about 50%.

Embodiment 20: The lubricating oil composition of any of embodiments 11-19, further comprising a pour point of about −35° C. or less.

Embodiment 21: A lubricating oil composition, comprising:
  a base oil and an ethylene copolymer comprising 40 wt % to 70 wt % of units derived from ethylene and at least 12 wt % of units derived from at least one α-olefin having 3 to 20 carbon atoms, wherein the copolymer has:
  a weight-average molecular weight (Mw), as measured by GPC, in the range of about 50,000 to about 200,000 g/mol;
  a melting point (Tm), as measured by DSC, of at least 100° C.;
  a ratio of Mw/Mn of about 1.5 to about 3.5; and
  a content of Group 4 metals derived from a catalyst of 25 ppm or less.

Embodiment 22: The lubricating oil composition of embodiment 21, wherein the ethylene copolymer has a ratio of wt ppm Group 4 metals derived from a catalyst to wt ppm Group 5 metals derived from a catalyst of at least 3.

Embodiment 23: The lubricating oil composition of embodiment 21 or 22, wherein the ethylene copolymer further comprises a shear stability index, SSI, and a thickening efficiency, TE, satisfying the relation: TE>0.034*SSI+0.08.

Embodiment 24: The lubricating oil composition of any of embodiments 21-23, further comprising a pour point of about −40° C. or less.

Embodiment 25: The lubricating oil composition of any of embodiments 21-24, further comprising a shear stability index, SSI, of about 35% to about 50%.

Embodiment 26: A method for making a lubricating oil composition, comprising:
reacting ethylene and propylene in the presence of m-dimethylsilyl,bisindenyl hafnium dimethyl and trimethylammonium tetrakis-pentafluorophenylborate at conditions sufficient to produce a semicrystalline copolymer comprising 40 wt % to 70 wt % of units derived from ethylene and at least 12 wt % of units derived from at least one α-olefin having 3 to 20 carbon atoms, wherein the semicrystalline copolymer has:
a weight-average molecular weight (Mw), as measured by GPC, in the range of about 50,000 to about 200,000 g/mol;
a melting point (Tm), as measured by DSC, of at least 100° C.;
a ratio of Mw/Mn of about 1.5 to about 3.5; and
a content of Group 4 metals derived from a catalyst of 25 ppm or less
blending the semicrystalline copolymer with a base oil in an amount sufficient to produce a lubricating oil composition.

Embodiment 27: The method of embodiment 26, wherein the semicrysaline copolymer has a ratio of wt ppm Group 4 metals derived from a catalyst to wt ppm Group 5 metals derived from a catalyst of at least 3.

Embodiment 28: The method of embodiment 26 or 27, wherein the semicrysaline copolymer has a weight-average molecular weight (Mw), as measured by GPC, of about 50,000 g/mol to about 200,000 g/mol.

Embodiment 29: The method of any of embodiments 26-28, further comprising a shear stability index, SSI, and a thickening efficiency, TE, satisfying the relation: TE>0.034*SSI+0.8.

Embodiment 30: The method of any of embodiments 26-29, further comprising a shear stability index, SSI, and a thickening efficiency, TE, satisfying the relation: TE>0.034*SSI+1.0.

Embodiment 31: The method of any of embodiments 26-30, further comprising a shear stability index, SSI, and a thickening efficiency, TE, satisfying the relation: TE>0.034*SSI+1.1.

Embodiment 32: The method of any of embodiments 26-31, further comprising a pour point of about −40° C. or less.

Embodiment 33: The method of any of embodiments 26-32, further comprising a low temperature viscosity in a Mini Rotary Viscometer (MRV) test at −25° C. of about 20,000 cP or less.

Embodiment 34: The method of any of embodiments 26-33, further comprising a shear stability index, SSI, of about 35% to about 50%.

Embodiment 35: The method of any of embodiments 26-34, further comprising a pour point of about −35° C. or less.

Embodiment 36: A lubricating oil composition, comprising a base oil and an ethylene copolymer comprising 70 wt. % to 85 wt. % of units derived from ethylene and at least 12 wt. % of units derived from at least one α-olefin having 3 to 20 carbon atoms, wherein the copolymer has the following properties:
(a) a weight-average molecular weight (Mw), as measured by GPC, in the range of 50,000 to 200,000 g/mol;
(b) a melting point (Tm), as measured by DSC, of at least 100° C.;
(c) a ratio of Mw/Mn of 1.8 to 2.5; and
(d) a content of Group 4 metals derived from catalyst of no more than 25 ppm.

Embodiment 37: The lubricating oil composition of embodiment 36, wherein the ethylene copolymer has a ratio of wt ppm Group 4 metals derived from a catalyst/wt ppm Group 5 metals derived from a catalyst of at least 3.

Embodiment 38: The lubricating oil composition of embodiment 36 or 37, wherein the ethylene copolymer has a melting point (Tm), as measured by DSC, of at least 110° C.

Embodiment 39: The composition of any of embodiments 36-38, wherein the ethylene copolymer has a weight-average molecular weight (Mw), as measured by GPC, of about 50,000 g/mol to about 200,000 g/mol.

Embodiment 40: The composition of any of embodiments 36-39, further comprising a shear stability index, SSI, and a thickening efficiency, TE, satisfying the relation: TE>0.034*SSI+0.8.

Embodiment 41: The composition of any of embodiments 36-39, further comprising a shear stability index, SSI, and a thickening efficiency, TE, satisfying the relation: TE>0.034*SSI+1.0.

Embodiment 42: The composition of any of embodiments 36-39, further comprising a shear stability index, SSI, and a thickening efficiency, TE, satisfying the relation: TE>0.034*SSI+1.1.

Embodiment 43: The composition of any of embodiments 36-42, further comprising a pour point of about −40° C. or less.

Embodiment 44: The composition of any of embodiments 36-43, further comprising a low temperature viscosity in a Mini Rotary Viscometer (MRV) test at −25° C. of about 20,000 cP or less.

Embodiment 45: The composition of any of embodiments 36-44, further comprising a shear stability index, SSI, of about 35% to about 50%.

Embodiment 46: The composition of any of embodiments 36-45, further comprising a pour point of about −35° C. or less.

Embodiment 47: The composition of any of embodiments 1-25 or 36-47, wherein the ethylene copolymer is prepared in a single reactor.

Embodiment 48: The method of any of embodiments 26-35, wherein the ethylene copolymer is prepared in a single reactor.

Embodiment 49: A lubricating oil composition of any of Embodiments 1-10.

Examples

The foregoing discussion can be further described with reference to the following non-limiting examples. Six polymer compositions made according to one or more embodiments described herein are provided. Examples 1 to 3 represent high SSI viscosity index improvers having low ethylene contents and Examples 4 to 6 represent high SSI viscosity index improvers having high ethylene contents. The method for making each example and its resulting properties and resulting lube oil compositions containing the same are described below.

Examples 1 to 3

The compositions in Examples 1 to 3 were synthesized in one continuous stirred tank reactor. The polymerization was performed in solution, using isohexane as a solvent. In the reactor, polymerization was performed at an overall pressure of 290 psi (2 MPa). Ethylene and propylene feed rates, reactor temperatures are listed in Table 1.

The catalyst was rac-dimethylsilylbis(indenyl) hafnium dimethyl (metallocene) pre-activated with a trimethylammonium tetrakis(pentafluorophenyl)borate (activator) in a toluene solution that was fed into the reactor. The molar ratio of metallocene to activator was about 1:1.03. The metallocene concentration in toluene was $1.74*10^{-4}$ moles/liter and the activator concentration was $1.68*10^{-4}$ moles/liter. The feed rate of the catalyst solution is listed in Table 1. Tri n-octyl aluminum (TNOA) was dissolved in isohexane at 25 wt % and fed into the reactor as a scavenger. The feed rate of the scavenger solution is listed in Table 1.

In the process, temperature control was used to achieve the desired molecular weight. The copolymer solution emerging from the reactor was stopped from further polymerization by addition of water and then devolatilized using conventionally known devolatilization methods such as flashing or liquid phase separation, first by removing the bulk of the isohexane to provide a concentrated solution, and then by stripping the remainder of the solvent in anhydrous conditions using a devolatilizer or a twin screw devolatilizing extruder so as to end up with a molten polymer composition containing less than 0.5 wt % of solvent and other volatiles. The molten polymer was cooled until solid.

TABLE 1

Reaction Parameters for Examples 1-3.

|  | Example | | |
|---|---|---|---|
|  | 1 | 2 | 3 |
| weight of final polymer (grams) | 297.2 | 398 | 387 |
| % ethylene in the product | 46.27 | 47.09 | 48.77 |
| Cat feed rate (g/h) | 0.00516 | 0.00516 | 0.00516 |
| TNOA feed rate (mol//h) | $3.35*10^{-4}$ | $3.35*10^{-4}$ | $3.35*10^{-4}$ |
| C2 feed rate (g/h) | 330 | 358.7 | 358.7 |
| C3 feed rate (g/h) | 761.4 | 762.17 | 764.32 |
| C6 feed Rate (g/h) | 3564 | 3564 | 3564 |
| Reaction temp. (° C.) | 65 | 70 | 80 |
| Production Rate (g/h) | 324.6 | 426.6 | 402.7 |

TABLE 2

Comparison Examples 1 to 3 to polymers of U.S. Pat. No. 6,589,920.

|  | MFR (g/10 min) | Ethylene (wt %) | Tm (° C.) |
|---|---|---|---|
| Example 1 | 0.94 | 46.3 | 33.4 |
| Example 2 | 1.15 | 47.1 | 37.9 |
| Example 3 | 1.4 | 48.8 | 43.2 |

TABLE 2-continued

Comparison Examples 1 to 3 to polymers of U.S. Pat. No. 6,589,920.

|  | MFR (g/10 min) | Ethylene (wt %) | Tm (° C.) |
|---|---|---|---|
| '920 Ex. 6 | — | 47.2 | −38.5 |
| '920 Ex. 7 | — | 46.8 | −36.2 |
| '920 Ex. 8 | — | 49.6 | −40.8 |

Table 2 compares the copolymers of Examples 1 to 3 to copolymers made according to U.S. Pat. No. 6,589,920, which is incorporated herein by reference. Examples 1-3 have substantially higher, about 60° C. higher, melting points than the polymers made according to U.S. Pat. No. 6,589,920, indicating that the polymers of Examples 1-3 are structurally different than the polymers of the '920 Patent.

Examples 4 to 6

The polymerization procedure used in Examples 4 to 6 was the same as described in Example 1-3 except for the reaction parameters summarized in Table 3 below.

TABLE 3

Reaction Parameters for Examples 4-6.

|  | Example | | |
|---|---|---|---|
|  | 4 | 5 | 6 |
| weight of final polymer (grams) | 39.5 | 27.3 | 103 |
| wt % ethylene in the product | 57.89 | 57.75 | 53.21 |
| Catalyst feed rate (g/h) | 0.00516 | 0.00516 | 0.00516 |
| TNOA feed rate (g/h) | 0.12 | 0.12 | 0.12 |
| C2 feed rate (g/h) | 785.5 | 765.7 | 765.7 |
| C3 feed rate (g/h) | 250.9 | 320.9 | 320.9 |
| C6 feed Rate (g/h) | 3564 | 3564 | 3564 |
| Reaction temperature (° C.) | 100 | 120 | 100 |
| Production Rate (g/h) | 101.1 | 81.1 | 76.7 |

The properties of the resultant copolymers from Examples 1-6 are summarized in Table 4.

Thickening Efficiency (TE) was determined according to ASTM D445.

Shear stability index (SSI) was determined according to ASTM D6278, and reported as SSI (30). A 90 cycle test was also performed, otherwise according to ASTM D6278, and reported as SSI (90).

EHC 45 and EHC 60 are Group II base oils available from Imperial Oil, Canada. Infineum D3426 is an engine oil additive package.

TABLE 4

Copolymer Properties

| Example | TE | SSI (30) | SSI (90) | wt % C2 | Mn | Mw | Mz | DSC | Mw/Mn | Mz/Mw | MFR (g/10 min) |
|---|---|---|---|---|---|---|---|---|---|---|---|
| 1 | 3.03 | 53.16 | 57.11 | 46.3 |  | 196463 |  | 33.4 |  |  | 0.94 |
| 2 | 2.8 | 47.75 | 52.12 | 47.1 |  | 176314 |  | 37.9 |  |  | 1.15 |
| 3 | 2.66 | 45.29 | 49.23 | 48.8 |  | 165570 |  | 43.2 |  |  | 1.4 |
| 4 | 2.4 | 36.4 | 39.9 | 57.89 | 45066 | 110543 | 221631 | 59.19 | 2.45 | 2.00 | 3.09 |
| 5 | 1.79 | 18.6 | 22 | 57.75 | 33931 | 71202 | 138163 | 58.52 | 2.10 | 1.94 | 3.04* |
| 6 | 2.16 | 30 | 34.1 | 53.21 | 45917 | 98766 | 181746 | 43 | 2.15 | 1.84 | 6.89 |
| Paratone 8900K | 2.00 | 24.00 |  | 65 |  | 90,000 |  |  | 1.9 |  |  |
| Paratone 8941 | 2.70 | 35.00 |  | 60.00 |  | 157,681 |  |  | 1.50 |  |  |
| Paratone 8910 | 3.40 | 50.00 |  | 60.00 |  | 109,611 |  |  | 1.40 |  |  |

*Second measurement was 14.5 g/10 min

TABLE 5

Lube oil composition blends with Examples 4-6 (high ethylene resins).

| Detailed Description | | Blend 0 | Blend 1 | Blend 2 | Blend 6 | Blend 7 | Blend 8 |
|---|---|---|---|---|---|---|---|
| | Type | | | | | | |
| EHC 45 (4.6 Cst) | BS Gp II+ | 53 | 52 | 52 | 52 | 52 | 52 |
| EHC 60 (6.1 Cst) | BS Gp II+ | 31 | 30.6 | 30.6 | 30.6 | 30.6 | 30.6 |
| Paratone 8900G | | | 1.4 | | | | |
| Paratone 8900K | | | | 1.4 | | | |
| Polymer from Example 4 | | | | | 1.4 | | |
| Polymer from Example 5 | | | | | | 1.4 | |
| Polymer from Example 6 | | | | | | | 1.4 |
| Infineum D3426 | Addpkg | 14 | 14 | 14 | 14 | 14 | 14 |
| Infineum 9340 (400BN) | Mg Sulfonate | 0.7 | 0.7 | 0.7 | 0.7 | 0.7 | 0.7 |
| Infineum 9330 (300BN) | Ca Sulfonate | 1 | 1 | 1 | 1 | 1 | 1 |
| Infineum V387 | PPD | 0.3 | 0.3 | 0.3 | 0.3 | 0.3 | 0.3 |
| | Method | | | | | | |
| KV 100 (cSt) | D445-5 (30 mL) | 8.101 | 19.69 | 19.16 | 22.41 | 17.14 | 19.97 |
| CCS @-20 C. (cP) | D5293-4 (60 mL) | 2460 | 3090 | 3150 | 3640 | 3540 | 3560 |
| MRV @-25 C. (yield stress) | D4684-4 (30 mL) | <35 | <35 | <35 | <35 | <35 | <35 |
| MRV @-25 C. visc. (cP) | D4684-4 (30 mL) | 8200 | 15,200 | 13,700 | 18,600 | 13,800 | 16,400 |
| MRV @-30 C. (yield stress) | D4684-5 (30 mL) | <35 | <35 | <35 | <35 | <35 | <35 |
| MRV @-30 C. visc. (cP) | D4684-5 (30 mL) | 18100* | 53,800** | 30,100*** | 48,800 | 35,900 | 44,800 |
| Pour Point | D5949-31 (2 mL) | -45° C. | -40° C. | -41° C. | -42° C. | -44° C. | -49° C. |

*repeat test result = 20,100
**repeat test result = 38,400,
***repeat test result = 36,600

TABLE 6

Lube oil composition blends with Examples 1-3 (low ethylene resins).

| Detailed Description | | Blend 0 | Blend 1 | Blend 2 | Blend 3 | Blend 4 | Blend 5 | Blend 6 | Blend 7 | Blend 8 |
|---|---|---|---|---|---|---|---|---|---|---|
| | Description | | | | | | | | | |
| AC-150 base oil | BS Gp I (5.1 cst) | 84 | 82.6 | 82.6 | 82.6 | 82.6 | 82.6 | 83.3 | 83.2 | 83.1 |
| Paratone 8900G | | | 1.4 | | | | | | | |
| Paratone 8900K | | | | 1.4 | | | | | | |
| Polymer from Example 1 | | | | | 1.4 | | | 0.7 | | |
| Polymer from Example 2 | | | | | | 1.4 | | | 0.8 | |
| Polymer from Example 3 | | | | | | | 1.4 | | | 0.9 |
| Infineum D3426 | Addpkg | 14 | 14 | 14 | 14 | 14 | 14 | 14 | 14 | 14 |
| Infineum 9340 (400BN) | Mg Sulfonate | 0.7 | 0.7 | 0.7 | 0.7 | 0.7 | 0.7 | 0.7 | 0.7 | 0.7 |
| Infineum 9330 (300BN) | Ca Sulfonate | 1 | 1 | 1 | 1 | 1 | 1 | 1 | 1 | 1 |
| Infineum V387 | PPD | 0.3 | 0.3 | 0.3 | 0.3 | 0.3 | 0.3 | 0.3 | 0.3 | 0.3 |
| | Method | | | | | | | | | |
| KV 100 (cSt) | D445-5 (30 mL) | 8.674 | 21.9 | 21.01 | 30.56 | 28.65 | 25.6 | 16.64 | 17.26 | 18.08 |
| CCS @-20 C. (cP) | D5293-4 (60 mL) | | 5650 | 5860 | 5780 | 5870 | 5610 | 5210 | 5320 | 5510 |
| MRV @-25 C. (yield stress) | D4684-4 (30 mL) | <35 | <35 | <35 | <35 | <35 | <35 | <35 | <35 | <35 |
| MRV @-25 C. visc. (cP) | D4684-4 | 12500 | 22,500 | 26,900 | 45,900 | 43,700 | 36,700 | 26800 | 27000 | 27300 |
| Pour Point | D5943-31 (2 mL) | -44° C. | -39° C. | -36° C. | -37° C. | -38° C. | -37° C. | -42° C. | -41° C. | -44° C. |

Infineum 9340 (400BN) is a Mg Sulfonate additive.
Infineum 9330 (300BN) is a Ca Sulfonate additive.
Infineum V387 is a Pour Point Depressant.
Cold cranking simulator (CCS) tests were performed at -20° C., according to ASTM D5293.
Mini rotary viscometer (MRV) tests were performed at -30° C., according to ASTM D4684.
Pour point was determined according to ASTM D97.
As shown in Tables 4-6, the low ethylene, high SSI viscosity index improvers (Examples 1-3) exhibited excellent low temperature properties (no gelation, low pour point), and had a higher melting point at equal ethylene concentrations than what was known in the art, as evidenced by the examples in the '920 patent. Consequently, the oil compositions comprising the low temperature, high SSI viscosity index improvers did not gel as evidenced by the pour point values.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A composition comprising an ethylene-propylene copolymer, which copolymer was prepared in a single reactor using a single catalyst system, comprising 40 wt % to 65 wt % of units derived from ethylene, and at least 35 wt % of units derived from propylene, wherein the composition has:
   40-65 wt % units derived from ethylene;
   a melting point (Tm) in ° C., as measured by DSC, that satisfies the relation:

$Tm > 3.4 \times E - 180$ where E is the weight % of units derived from ethylene in the ethylene-propylene copolymer;
   a Mw/Mn ratio of about 1.5 to about 3.5; and
   a content of Group 4 metals derived from a catalyst of 25 ppm or less.

2. The composition of claim 1, wherein the ethylene-propylene copolymer has a weight-average molecular weight (Mw), as measured by GPC, of about 50,000 g/mol to about 200,000 g/mol.

3. The composition of claim 1, wherein the composition has a shear stability index, SSI, and a thickening efficiency, TE, satisfying the relation: TE>0.034*SSI+0.8.

4. The composition of claim 1, wherein the composition has a pour point of about −35° C. or less.

5. The composition of claim 1, wherein the composition has a low temperature viscosity in a Mini Rotary Viscometer (MRV) test at −25° C. of about 20,000 cP or less.

6. The composition of claim 1, wherein the composition has a shear stability index, SSI, of about 35% to about 50%.

7. The composition of claim 1, wherein the ethylene-propylene copolymer has a ratio of wt ppm Group 4 metals derived from a catalyst to wt ppm Group 5 metals derived from a catalyst of at least 3.

8. A lubricating oil composition, comprising:
   a base oil; and
   a high SSI viscosity index improver comprising an ethylene-propylene copolymer, which copolymer was prepared in a single reactor using a single catalyst system, comprising 40 wt % to 65 wt % of units derived from ethylene; and at least 35 wt % of units derived from propylene, wherein the ethylene-propylene copolymer has:
   a melting point (Tm) in ° C., as measured by DSC, that satisfies the relation:

$Tm > 3.4 \times E - 180$ where E is the weight % of units derived from ethylene in the ethylene-propylene copolymer;
   a ratio of Mw/Mn of about 1.5 to about 3.5; and
   a content of Group 4 metals derived from a catalyst of 25 ppm or less; and
   further wherein the high SSI viscosity index improver has 40 wt % to 65 wt % units derived from ethylene.

9. The lubricating oil composition of claim 8, wherein the ethylene-propylene copolymer has a weight-average molecular weight (Mw), as measured by GPC, of about 50,000 g/mol to about 200,000 g/mol.

10. The lubricating oil composition of claim 8, wherein the lubricating oil composition has a shear stability index, SSI, and a thickening efficiency, TE, satisfying the relation: TE>0.034*SSI+0.8.

11. The lubricating oil composition of claim 8, wherein the lubricating oil composition has a pour point of about −35° C. or less.

12. The lubricating oil composition of claim 8, wherein the lubricating oil composition has a low temperature viscosity in a Mini Rotary Viscometer (MRV) test at −25° C. of about 20,000 cP or less.

13. The lubricating oil composition of claim 8, wherein the lubricating oil composition has a shear stability index, SSI, of about 35% to about 50%.

14. The lubricating oil composition of claim 8, wherein the ethylene-propylene copolymer has a ratio of wt ppm Group 4 metals derived from a catalyst to wt ppm Group 5 metals derived from a catalyst of at least 3.

15. A lubricating oil composition, comprising:
   a base oil and a high SSI viscosity index improver comprising an ethylene-propylene copolymer, which copolymer was prepared in a single reactor using a single catalyst system, comprising 40 wt % to 65 wt % of units derived from ethylene and at least 12 wt % of units derived from propylene, wherein the ethylene-propylene copolymer has:
   a weight-average molecular weight (Mw), as measured by GPC, in the range of about 50,000 to about 200,000 g/mol;
   a melting point (Tm), as measured by DSC, of at least 100° C.;
   a ratio of Mw/Mn of about 1.5 to about 3.5; and
   a content of Group 4 metals derived from a catalyst of 25 ppm or less; and
   further wherein the high SSI viscosity index improver has 40 wt % to 65 wt % units derived from ethylene.

16. The lubricating oil composition of claim 15, wherein the ethylene-propylene copolymer further comprises a shear stability index, SSI, and a thickening efficiency, TE, satisfying the relation: TE>0.034*SSI+0.08.

17. The lubricating oil composition of claim 15, wherein the lubricating oil composition has a pour point of about −40° C. or less.

18. The lubricating oil composition of claim 15, wherein the lubricating oil composition has a shear stability index, SSI, of about 35% to about 50%.

19. The lubricating oil composition of claim 15, wherein the ethylene-propylene copolymer has a ratio of wt ppm Group 4 metals derived from a catalyst to wt ppm Group 5 metals derived from a catalyst of at least 3.

20. A method for making a lubricating oil composition, comprising:
   reacting ethylene and propylene in a single reactor in the presence of a single catalyst system at conditions sufficient to produce a high SSI viscosity index improver comprising an ethylene-propylene copolymer, said high SSI viscosity index improver having 40 wt % to 65 wt % of units derived from ethylene, wherein the single catalyst system consists of a dimethylsilyl(bisindenyl) hafnium dimethyl metallocene and a trimethylammonium tetrakis-pentafluorophenylborate activator; and wherein the ethylene-propylene copolymer has:
- 40 wt % to 65 wt % of units derived from ethylene and at least 35 wt % of units derived from propylene;
- a weight-average molecular weight (Mw), as measured by GPC, in the range of about 50,000 to about 200,000 g/mol;
- a melting point (Tm), as measured by DSC, that satisfies the relation:

$$Tm > 3.4 \times E - 180$$

where E is the weight % of units derived from ethylene in the ethylene-propylene copolymer;
- a ratio of Mw/Mn of about 1.5 to about 3.5; and
- a content of Group 4 metals derived from a catalyst of 25 ppm or less; and blending the high SSI viscosity index improver with a base oil in an amount sufficient to produce a lubricating oil composition.

21. The method of claim 20, wherein the ethylene-propylene copolymer has a ratio of wt ppm Group 4 metals derived from a catalyst to wt ppm Group 5 metals derived from a catalyst of at least 3.

22. The method of claim 20, wherein the ethylene-propylene copolymer has a weight-average molecular weight (Mw), as measured by GPC, of about 50,000 g/mol to about 200,000 g/mol.

23. The method of claim 20, wherein the ethylene-propylene copolymer has a shear stability index, SSI, and a thickening efficiency, TE, satisfying the relation: TE>0.034*SSI+0.8.

24. The method of claim 20, wherein the ethylene-propylene copolymer has a pour point of about −35° C. or less.

25. A lubricating oil composition comprising the composition of claim 1.

* * * * *